US010427561B2

(12) United States Patent
Akutsu et al.

(10) Patent No.: US 10,427,561 B2
(45) Date of Patent: Oct. 1, 2019

(54) VEHICULAR SEAT

(71) Applicant: TS TECH CO., LTD., Asaka-shi, Saitama (JP)

(72) Inventors: Takeshi Akutsu, Tochigi (JP); Hideki Usami, Tochigi (JP); Hiroshi Izawa, Tochigi (JP); Daisuke Kitagawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 205 days.

(21) Appl. No.: 15/525,801

(22) PCT Filed: Nov. 10, 2015

(86) PCT No.: PCT/JP2015/081623
§ 371 (c)(1),
(2) Date: May 10, 2017

(87) PCT Pub. No.: WO2016/076318
PCT Pub. Date: May 19, 2016

(65) Prior Publication Data
US 2017/0313215 A1    Nov. 2, 2017

(30) Foreign Application Priority Data

Nov. 11, 2014  (JP) ................. 2014-229250
Nov. 11, 2014  (JP) ................. 2014-229252
(Continued)

(51) Int. Cl.
*B60N 2/30*    (2006.01)
*B60N 2/12*    (2006.01)
(Continued)

(52) U.S. Cl.
CPC ........... *B60N 2/3075* (2013.01); *B60N 2/015* (2013.01); *B60N 2/06* (2013.01); *B60N 2/12* (2013.01);
(Continued)

(58) Field of Classification Search
CPC ... B60N 2/04; B60N 2/06; B60N 2/30; B60N 2/3004; B60N 2/3009; B60N 2/3013;
(Continued)

(56) References Cited

U.S. PATENT DOCUMENTS

2004/0056521 A1*  3/2004  Kayumi ................... B60N 2/01
                                                      297/334
2004/0212237 A1* 10/2004  Epaud ..................... B60N 2/06
                                                      297/331
(Continued)

FOREIGN PATENT DOCUMENTS

CN        1514784 A    7/2004
CN      105263747 A    1/2016
(Continued)

OTHER PUBLICATIONS

English translation of JP 2005-239050; retreived Feb. 21, 2019 from J Plat Pat located at https://www.j-platpat.inpit.go.jp/web/all/top/BTmTopEnglishPage. (Year: 2019).*
(Continued)

*Primary Examiner* — Jason S Daniels
(74) *Attorney, Agent, or Firm* — Drinker Biddle & Reath LLP

(57) ABSTRACT

A vehicular seat is provided with which compactness can be achieved in a housed state where a seat main body is housed. A vehicular seat is a seat configured to be housed in a housing recess formed in a vehicle body floor. The vehicular seat includes: right and left rail devices fixed on the vehicle body floor and supporting a seat main body to be movable
(Continued)

in the front to back direction; and a reclining device pivotably connecting the seat main body to a support base constructed on the right and left rail devices. The reclining device is arranged at a height position overlapping upper rails in the up and down direction, and is arranged outside the upper rails in a seat width direction.

20 Claims, 24 Drawing Sheets

(30) Foreign Application Priority Data

| | | | |
|---|---|---|---|
| Nov. 11, 2014 | (JP) | ................................ | 2014-229254 |
| Nov. 11, 2014 | (JP) | ................................ | 2014-229256 |
| Nov. 11, 2014 | (JP) | ................................ | 2014-299253 |

(51) Int. Cl.
*B60N 2/06* (2006.01)
*B60N 2/015* (2006.01)
*B60N 2/28* (2006.01)

(52) U.S. Cl.
CPC ............ *B60N 2/309* (2013.01); *B60N 2/3013* (2013.01); *B60N 2/3047* (2013.01); *B60N 2/3065* (2013.01); *B60N 2/3072* (2013.01); *B60N 2/2887* (2013.01)

(58) Field of Classification Search
CPC .. B60N 2/3047; B60N 2/3065; B60N 2/3072; B60N 2/3075
USPC ................................ 296/65.05, 65.09, 65.16
See application file for complete search history.

(56) References Cited

U.S. PATENT DOCUMENTS

| | | |
|---|---|---|
| 2013/0214551 A1 | 8/2013 | Maruyama |
| 2016/0046210 A1 | 2/2016 | Nakamura et al. |
| 2016/0137105 A1 | 5/2016 | Akutsu et al. |
| 2017/0313215 A1 | 11/2017 | Akutsu et al. |

FOREIGN PATENT DOCUMENTS

| | | | | |
|---|---|---|---|---|
| EP | 1 407 923 A1 | | 4/2004 | |
| EP | 1407923 A1 | * | 4/2004 | ........... B60N 2/3013 |
| JP | H02-098031 U | | 8/1990 | |
| JP | H05-023945 U | | 3/1993 | |
| JP | 07-19302 Y2 | | 5/1995 | |
| JP | 2000-103271 A | | 4/2000 | |
| JP | 2004-276642 A | | 10/2004 | |
| JP | 2005-239050 A | | 9/2005 | |
| JP | 2008-105575 A | | 5/2008 | |
| JP | 2009-067309 A | | 4/2009 | |
| JP | 2011-168117 A | | 9/2011 | |
| JP | 2012-030638 A | | 2/2012 | |
| JP | 2012201208 A | * | 10/2012 | |
| JP | 2013-173455 A | | 9/2013 | |
| JP | 2016-088480 A | | 5/2016 | |
| WO | 2014/168233 A1 | | 10/2014 | |

OTHER PUBLICATIONS

English translation of JP 2004-276642; retreived Feb. 21, 2019 from J Plat Pat located at https://www.j-platpat.inpit.go.jp/web/all/top/BTmTopEnglishPage. (Year: 2019).*
Office Action issued in related application CN 201580061192X, dated Sep. 19, 2018, with English language translation, 10 pages.
Office Action issued in related application JP 2014-229254, dated Sep. 11, 2018, with machine generated English language translation, 6 pages.
Office Action issued in related application JP 2014-229256, dated Sep. 18, 2018, with machine generated English language translation, 7 pages.
Office Action issued in related application CN 201580061192.X, May 30, 2019, with English language translation, 13 pages.
Office Action issued in related application JP 2018-192009, Jul. 16, 2019, with machine generated English language ranslation, 8 pages.

* cited by examiner

VEHICULAR SEAT

CROSS REFERENCE TO RELATED APPLICATIONS

This application is a National Stage Entry application of PCT Application No. PCT/JP2015/081623, filed Nov. 10, 2015, which claims the priority benefit of Japanese Patent Application Nos. JP 2014-229250, JP 2014-229252, JP 2014-229253, JP 2014-229254 and JP 2014-229256, filed Nov. 11, 2014, the contents being incorporated herein by reference.

BACKGROUND

The present disclosure relates to a vehicular seat and, more specifically, to a vehicular seat configured to house a seat back and a seat cushion in a position lower than a vehicle body floor.

Conventionally, vehicular seats configured to house a seat back and a seat cushion which form a seat main body in a housing floor formed at a position lower than a vehicle body floor are already known, and among them, a vehicular rear seat configured to house a seat main body to be forwardly folded in a housing floor provided in front of the seat exists (for example, see Japanese Patent Publication JP 2009-67309 A).

The vehicle seat described in Japanese Patent Publication JP 2009-67309 A includes a housing structure consisting of a mounting shaft mounted to a vehicle body floor and supporting a seat back pivotably, and a leg member whose upper end supports the front portion of a seat cushion and whose lower end is pivotably held in a holding groove fixed to a housing floor. At the time of a housing operation of a seat main body, the seat back rotates to move the seat cushion to the housing floor with respect to the vehicle body floor, and the leg member rotates around the holding groove in conjunction with the seat back, thereby housing the seat main body in the housing floor. Moreover, the vehicle seat is configured to be switched from a usage state where an occupant can sit to a tip-up state where the seat cushion is flipped up after detaching the leg member from the holding groove.

In the seat configured to house the seat main body like Japanese Patent Publication JP 2009-67309 A, a free space in a housed state where the seat main body is housed can be used as a luggage room space. Therefore, in order to secure the luggage room space as wide as possible, compactness of the seat in a housed state has been demanded.

Moreover, in the seat in Japanese Patent Publication JP 2009-67309 A, component parts of a housing structure are mounted not only on the vehicle body floor surface on which the seat main body is installed but also on the housing floor surface, which complicated the structure for housing the seat main body. Therefore, a vehicular seat configured to be housed in a housing floor with a simple structure has been demanded.

Moreover, in the seat like Japanese Patent Publication JP 2009-67309 A, the leg member supporting the seat cushion was a long member because of being connected between the seat cushion and the housing floor. Then, when attaching and detaching the leg member to and from the holding groove in a switching operation of a usage state and a tip-up state, the deflection width in the front to back direction of the detached leg member is increased due to a long total length of the leg member, so an operation of reattaching the leg member to the holding groove was made difficult. Thus, a vehicular seat in which a switching operation from a usage state is easy has been demanded.

Moreover, in the seat like Japanese Patent Publication JP 2009-67309 A, a tether anchor for connecting a child seat is generally assembled to a predetermined position of the seat main body (the seat back or the seat cushion). When assembling the tether anchor to the seat main body, while assembly rigidity of the tether anchor is required to be secured, the seat main body was increased in weight and size if the tether anchor was easily increased in weight and size. Thus, a vehicular seat having reduced weight and size of a seat main body while securing assembly rigidity of a tether anchor has been demanded. In particular, in the seat configured to house the seat main body, the complicated housing structure is included, so the arrangement of the tether anchor has been further required to be devised.

Moreover, in the seat configured to house the seat main body like Japanese Patent Publication JP 2009-67309 A, for the purpose of protecting it from the external impact and preventing invasion by foreign matters, a resin cover, covering the mounting shaft, the holding groove and the like which form the housing structure from above, is generally mounted. However, it was not considered to facilitate a switching operation from a usage state by using the cover. Therefore, a vehicular seat in which a switching operation from a usage state is facilitated by using existing component parts including the cover has been demanded.

Moreover, the resin cover described above is generally formed into a bottomed box-shape and covers the upper portions and the side portions of the mounting shaft, the holding groove and the like. However, in the upper part in a usage state, a seat portion is arranged in a standing condition, so when assembling the cover, a working sequence was likely to be defined, and steps of the sequence were likely to be complicated. Against such a background, in order to improve working efficiency, a technique to divide the cover exists. Thus, by dividing the cover, respective cover pieces can be inserted to be joined, so workability is improved. However, alignment of respective cover pieces was complicated. Moreover, rigidity of bond portions was required to be further improved. Further, by making the bond portions difficult to be viewed, design characteristic were required to be secured.

Moreover, in the seat configured to house the seat main body like Japanese Patent Publication JP 2009-67309 A, a reclining mechanism for connecting the seat back foldably, a housing mechanism for housing the seat main body in the housing floor, and the like are included, which complicates the structure. Therefore, it is desirable to secure rigidity of the entire seat by devising an arrangement of the component parts. On the other hand, when arranging the seat in a vehicle, aiming at an arrangement layout in light of the shape of a vehicle interior and an installation space of interior parts, it may be beneficial to arrange the seat back to be displaced to one side of a seat width direction by exercising ingenuity when the seat cushion is a reference position. In the seat described above, a design taking account of even the arrangement layout in the vehicle while securing rigidity of the entire seat has been desired.

SUMMARY

The present disclosure is described in consideration of the above problems, and an embodiment of the present disclosure provides a vehicular seat of which compactness can be achieved in a housed state where a seat main body is housed.

Moreover, an embodiment of the present disclosure provides a vehicular seat configured to be housed in a housing floor with a simple structure. Moreover, an embodiment of the present disclosure provides a vehicular seat in which a switching operation from a usage state is facilitated. Moreover, an embodiment of the present disclosure provides a vehicular seat securing assembly rigidity of a tether anchor and reducing the weight and size of a seat main body. Moreover, an embodiment of the present disclosure provides a vehicular seat having improved efficiency of manufacturing operations by facilitating alignment of individual cover pieces and securing the degree of freedom of working sequence. Moreover, an embodiment of the present disclosure provides a vehicular seat configured to provide higher rigidity and design characteristics. Moreover, an embodiment of the present disclosure provides a vehicular seat securing rigidity of the entire seat and taking account of even the arrangement layout in a vehicle.

In accordance with the present disclosure, at least some of the above problems are solved by an embodiment of a vehicular seat including a seat main body having a seat back which is a backrest part, and a seat cushion which is connected to the seat back and is a seating part, where the seat main body is configured to be housed in a housing position formed in a vehicle body floor, the vehicular seat including: right and left lower rails that are mounted to the vehicle body floor and extend in a seat front to back direction, right and left upper rails that are slidably mounted along the lower rails and that support the seat main body, and a reclining device that is arranged at a height position which overlaps the upper rails in an up and down direction and pivotably supports the seat main body from a vehicle body floor side of the seat main body.

As described above, since the reclining device is arranged at a height position overlapping the upper rails mounted to the vehicle body floor in the up and down direction, the height position of the reclining device can be set lower compared with the conventional art. As a result, the height position of the entire seat becomes lower when the seat main body is rotated to be housed to the vehicle body floor side, and a luggage room space formed in the upper part of the seat can be secured widely. That is to say, a vehicular seat of which compactness can be achieved in a housed state can be realized.

In an embodiment, the seat main body is configured to be housed in a position lower than the vehicle body floor, and the vehicular seat includes a support base mounted to the right and left upper rails and supporting the seat main body, a seat pivot shaft mounted to the support base and connected to one end side of the seat main body in the seat front to back direction as a pivot shaft of the reclining device, and a detachable leg, an upper end portion of the detachable leg being mounted to an other end side of the seat main body and a lower end portion of the detachable leg being detachably supported on the support base. As described above, since the component parts of the housing structure are all arranged on the vehicle body floor, a vehicular seat configured to be housed in a housing floor with a simple structure can be realized. Moreover, since the lower end portion of the detachable leg is arranged on the vehicle body floor rather than the housing floor in a conventional manner, the total length of the detachable leg can be reduced. The deflection width in the front to back direction of the detachable leg is reduced by a degree of smallness of the total length of the detachable leg, so the detachable leg is easily held by a leg holding member. Accordingly, a switching operation from a usage state is further facilitated.

In an embodiment, the reclining device is preferably arranged on an outside in a seat width direction than the upper rails. According to the above configuration, the reclining device does not interfere with the component parts arranged between the right and left upper rails, so the degree of freedom of the arrangement layout of the reclining device is increased. Moreover, the pitch between the right and left upper rails can be narrowed, and the seat can be suppressed from increasing in size in the seat width direction.

In an embodiment, the vehicular seat includes a rail locking device mounted between the right and left upper rails and configured to lock the upper rails in a state of being supported by the lower rails, and the reclining device is arranged to overlap the rail locking device in the seat front to back direction. According to the above configuration, the seat can be suppressed from increasing in size in the seat front to back direction.

In an embodiment, the vehicular seat includes a buckle arranged on an outside in a seat width direction than the seat main body and configured for attachment of a tongue plate provided at a seat belt, and the reclining device and the buckle are arranged at opposite positions of the seat main body in the seat width direction relative to each other. According to the above configuration, the degree of freedom of mutual arrangement layout is improved.

In an embodiment, the vehicular seat includes floor connecting members that connect the lower rails to the vehicle body floor, and the floor connecting members are arranged in a right and left positions that overlap the reclining device in a seat width direction. According to the above configuration, the seat main body can efficiently withstand the load applied in the seat front to back direction.

In an embodiment, the floor connecting members are preferably arranged behind the reclining device in the seat front to back direction. According to the above configuration, the seat main body can efficiently withstand the rear load applied at the time of acceleration and rear end collision of the vehicle.

In an embodiment, at least one of the floor connecting members is preferably arranged in front of the reclining device in the seat front to back direction. According to the above configuration, the seat main body can efficiently withstand the front load applied at the time of deceleration and front end collision of the vehicle.

In an embodiment, the vehicular seat includes a connecting bracket that connects a lower end portion of the seat back and the reclining device, and the connecting bracket is mounted further to an outside in a seat width direction than the reclining device and arranged at a position to sandwich the reclining device between the support base and the connecting bracket. According to the above configuration, assembly rigidity of the reclining device is improved.

In an embodiment, the vehicular seat further comprises right and left connecting brackets that are respectively provided in the right and left side portions of the seat back and connect a lower end portion of the seat back to the support base, where one of the right and left connecting brackets is arranged further to an outside in a seat width direction than one of the upper rails, and the other of the right and left connecting brackets is arranged further to an inside in the seat width direction than the other of the upper rails. According to the above configuration, either of the right and left connecting brackets can be assembled from one side in the seat width direction, and the efficiency of assembly work is increased.

In an embodiment, an anchor member for connecting a child seat is preferably mounted to the rear portions of the upper rails. As described above, since the anchor member is mounted to the rear portions of the upper rails fixed on the vehicle body floor, it may be assembled to component parts having a high rigidity compared with a case where it is mounted to the seat back and the seat cushion in a conventional manner. As a result, the anchor member can be suppressed from easily increasing in weight and size while securing assembly rigidity of the anchor member, which results in weight saving and miniaturization of the seat main body.

In an embodiment, the vehicular seat includes a rail locking device configured to lock the upper rails in a state of being supported by the lower rails, the rail locking device has an operation strap configured to switch the rail locking device between a locked state where the upper rails are locked and an unlocked state, and the operation strap is arranged adjacent to the anchor member. According to the above configuration, when assembling the anchor member by an operator, the front to back position of the seat main body can be appropriately adjusted by operating the operation strap located around the anchor member, so assembly work by the operator is made more efficient.

In an embodiment, a vehicular seat is configured to switch between a usage state where an occupant can sit and a movement state where the seat main body is moved from the usage state, and includes a support base provided on the vehicle body floor side, a seat pivot shaft mounted to the support base and connected to one end side of the seat main body either in the seat front to back direction or in a seat width direction so that the seat main body is pivotable, a detachable leg, an upper end side of the detachable leg being mounted to an other end side of the seat main body and a lower end side of the detachable leg being detachably held by a leg holding member provided on the support base, and a base cover that covers the support base from above and is configured to guide the detachable leg to move together with the seat main body when the seat main body moves between the usage state and the movement state, and where the base cover comprises a cover mounting part that is arranged in the periphery of the leg holding member and configured to mount to the support base. As described above, since the base cover covering the support base from above guides the detachable leg moving together with the seat main body when the seat main body moves between the usage state and the movement state, a vehicular seat in which a switching operation from the usage state is facilitated by using the base cover which is an existing component part can be realized. Then, since the base cover comprises the cover mounting part arranged around the leg holding member and configured to mount to the support base, assembling performance of the base cover around the leg holding member is stabilized, and guiding performance of the base cover to the detachable leg is stabilized. As a result, a switching operation from the usage state is further facilitated. Then, since the leg holding member is arranged on the vehicle body floor side rather than the housing floor in a conventional manner, the total length of the detachable leg can be reduced. The deflection width in the front to back direction of the detachable leg is reduced by a degree of smallness of the total length of the detachable leg, so the detachable leg is easily held by the leg holding member. Accordingly, a switching operation from the usage state is further facilitated.

In an embodiment, a vehicular seat is configured to switch between a usage state where an occupant can sit and a movement state where the seat main body is moved from the usage state, and includes a support base which is provided on the vehicle body floor side of the seat main body and arranged in a lower part of the seat cushion, and to which the lower end side of the seat back is pivotably connected, a seat pivot shaft mounted to the support base and connected to one end side of the seat main body either in the seat front to back direction or in a seat width direction so that the seat main body is pivotable, and a base cover that covers the support base from above, side portions of the support base are defined by a pair of side base parts, the base cover is configured to be divided into a front cover and a rear cover in the seat front to back direction, and a rear side end portion of the front cover and a front side end portion of the rear cover are fixed in a state where a cover fixed frame arranged to bridge the pair of side base parts is sandwiched therebetween. As described above, the base cover is configured to be able to be divided into the front cover and the rear cover. Therefore, at the time of assembling, the rear end portion of the front cover and the front end portion of the rear cover are connected, and, in this case, they are connected in a state where the cover fixed frame arranged to bridge a pair of supporting member is sandwiched therebetween. In other words, in a finished base cover, the front cover and the rear cover are connected in a state where the cover fixed frame is sandwiched between the rear end portion of the front cover and the front end portion of the rear cover. Therefore, at the time of assembly work, the cover fixed frame may be a standard for alignment, so alignment is facilitated.

In an embodiment, a vehicular seat configured to switch between a usage state where an occupant can sit and a movement state where the seat main body is moved from the usage state includes floor connecting members that connect the vehicular seat to a vehicle body floor, a center position of the seat back in a seat width direction is arranged to be displaced to one side in the seat width direction with respect to a center position of the seat cushion, and a center position of the floor connecting member in the seat width direction is arranged to be displaced to the one side with respect to the center position of the seat cushion. In the above vehicular seat, since the seat back is arranged to be displaced to one side in the seat width direction with respect to the seat cushion, a vehicular seat appropriately taking account of an arrangement layout in a vehicle can be realized. Then, since the floor connecting member is offset-arranged to be displaced to the same side as the side to which the seat back is displaced when the seat cushion is a reference position, the load of the sitting occupant can be efficiently received, and rigidity of the entire seat can be secured.

According to an embodiment of the present disclosure, the height position of the reclining device can be set lower compared with the conventional art. As a result, the height position of the entire seat becomes lower when the seat main body is housed, and a luggage room space formed in the upper part of the seat can be secured widely. That is to say, a vehicular seat of which compactness can be achieved in a housed state can be realized. According to an embodiment of the present disclosure, a seat configured to be housed in a housing floor with a simple structure can be realized. Moreover, when the seat main body moves between the usage state and the housed state, a switching operation is improved. According to an embodiment of the present disclosure, the degree of freedom of the arrangement layout of the reclining device is increased. Moreover, the seat can be suppressed from increasing in size in the seat width direction.

According to an embodiment of the present disclosure, the seat can be suppressed from increasing in size in the seat front to back direction. According to an embodiment of the present disclosure, the degree of freedom of mutual arrangement layout of the reclining device and the buckle is improved. According to an embodiment of the present disclosure, the seat main body can efficiently withstand the load applied in the seat front to back direction.

According to an embodiment of the present disclosure, the seat main body can efficiently withstand the rear load applied at the time of acceleration and rear end collision of the vehicle. According to an embodiment of the present disclosure, the seat main body can efficiently withstand the front load applied at the time of deceleration and front end collision of the vehicle. According to an embodiment of the present disclosure, assembly rigidity of the reclining device is improved.

According to an embodiment of the present disclosure, the efficiency of assembly work of the right and left connecting brackets is increased. According to an embodiment of the present disclosure, the anchor member for a child seat may be assembled to the component parts having a high rigidity compared with the conventional art. As a result, the anchor member can be suppressed from easily increasing in weight and size while securing assembly rigidity of the anchor member, which results in weight saving and miniaturization of the seat main body. According to an embodiment of the present disclosure, assembly work of the anchor member and the operation strap for rails by the operator is made more efficient.

According to an embodiment of the present disclosure, a vehicular seat in which a switching operation from the usage state is facilitated by using the base cover which is an existing component part can be realized. Moreover, assembling performance of the base cover around the leg holding member is stabilized, and guiding performance of the base cover to the detachable leg is stabilized. As a result, a switching operation is further facilitated. Moreover, since the leg holding member is arranged on the vehicle body floor side rather than the housing floor in a conventional manner, the total length of the detachable leg can be reduced. The deflection width in the front to back direction of the detachable leg is reduced by a degree of smallness of the total length of the detachable leg, so the detachable leg is easily held by the leg holding member. Accordingly, a switching operation is further facilitated. According to an embodiment of the present disclosure, the base cover is configured to be able to be divided into the front cover and the rear cover, and they are configured to be connected in a state where the cover fixed frame arranged to bridge the pair of supporting member is sandwiched therebetween. Therefore, at the time of assembly work, the cover fixed frame becomes a standard for alignment, so alignment is facilitated. According to an embodiment of the present disclosure, a vehicular seat appropriately taking account of an arrangement layout in a vehicle can be realized. Moreover, the load of the sitting occupant is efficiently received, and rigidity of the entire seat can be secured.

BRIEF DESCRIPTION OF DRAWINGS

Various embodiments of the invention are illustrated in the drawings, in which.

DETAILED DESCRIPTION

Hereinafter, a vehicular seat according to an embodiment of the present disclosure is described with reference to FIG. 1 to FIGS. 24A and 24B. The described embodiments relate to a vehicular seat configured to house a seat main body in a housing floor, the vehicular seat including: right and left rail devices fixed on a vehicle body floor and supporting the seat main body to be movable in the front to back direction;

and a reclining device pivotably connecting the seat main body to a support base constructed on the right and left rail devices, in which the reclining device is arranged at a height position overlapping upper rails in the up and down direction. It should be noted that the side on which an occupant sits with respect to a seat back of the vehicular seat is a seat front side.

Figure 1:
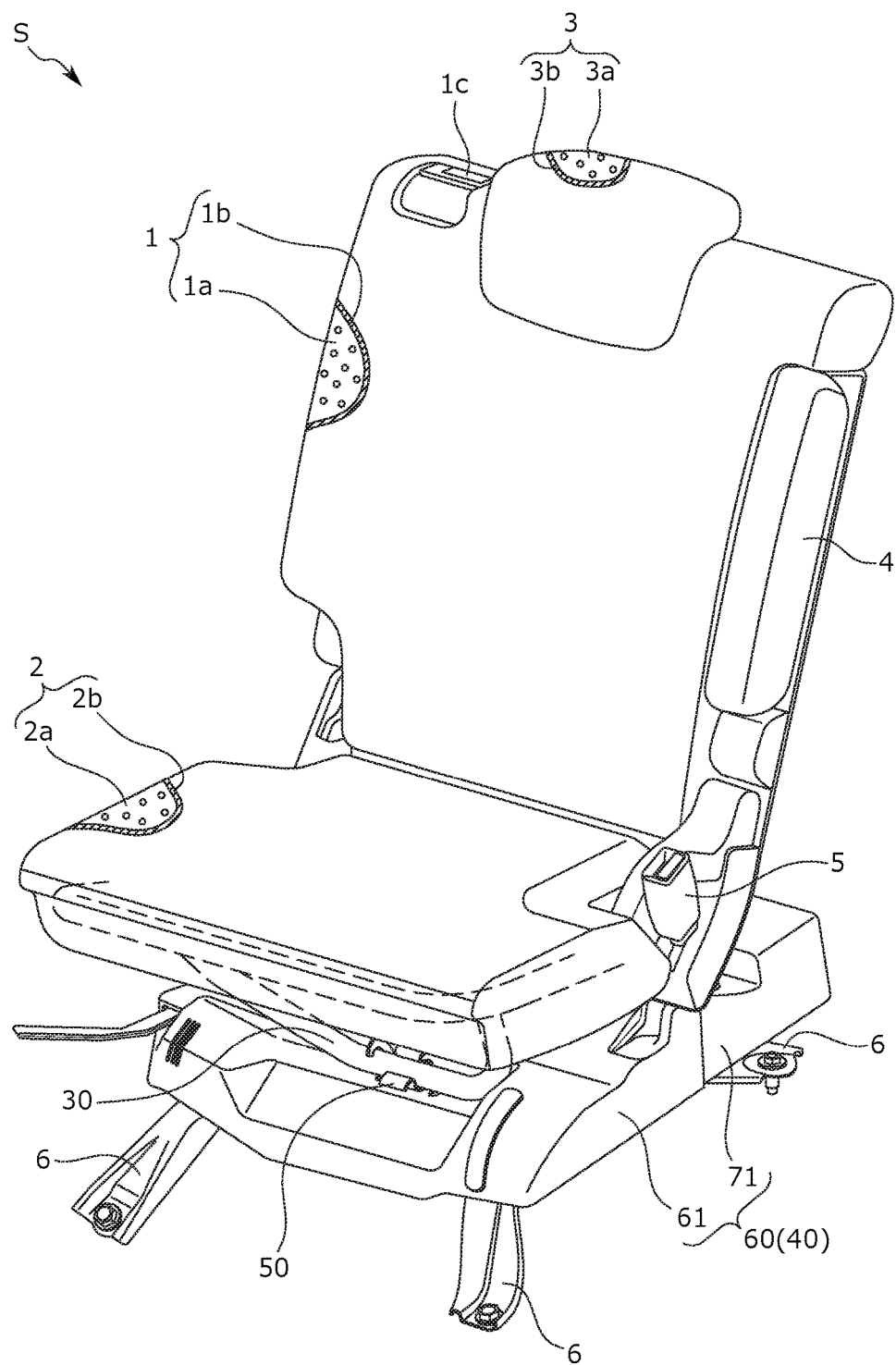
FIG. 1 is a perspective view of a vehicular seat according to an embodiment of the present embodiment.
Figure 2:
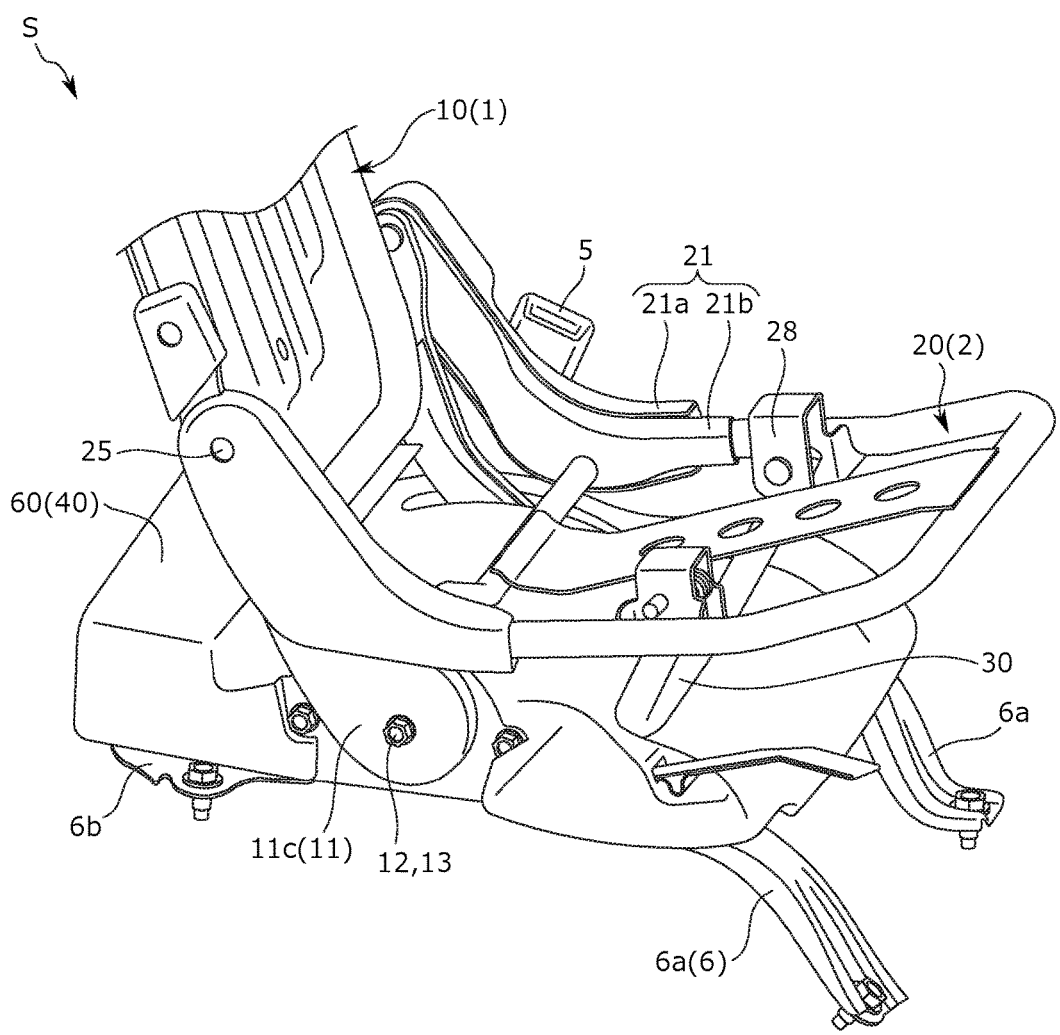
FIG. 2 is a perspective view of the vehicular seat viewed from another angle.
Figure 3:
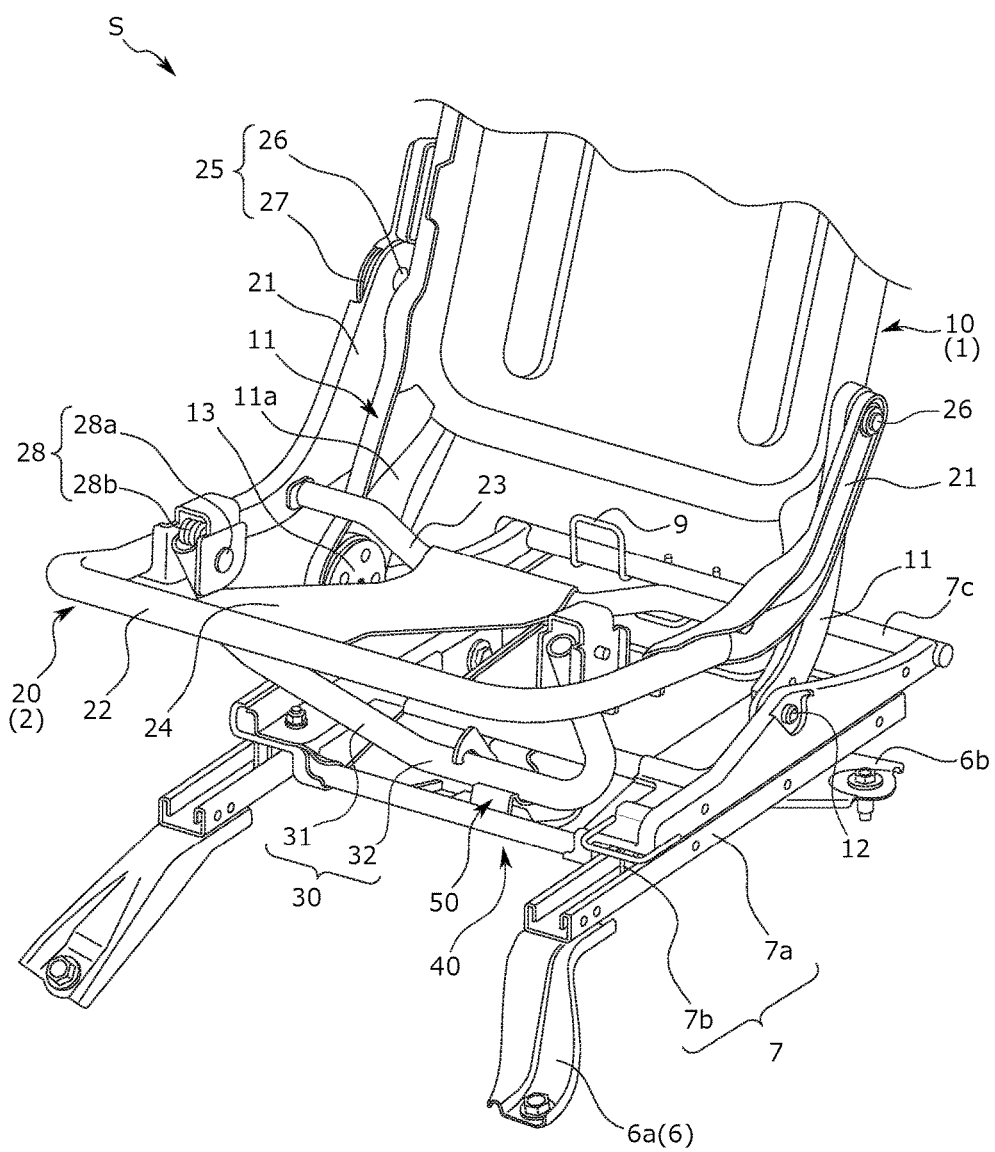
FIG. 3 is a perspective view of a seat frame serving as a framework of the vehicular seat.
Figure 4:
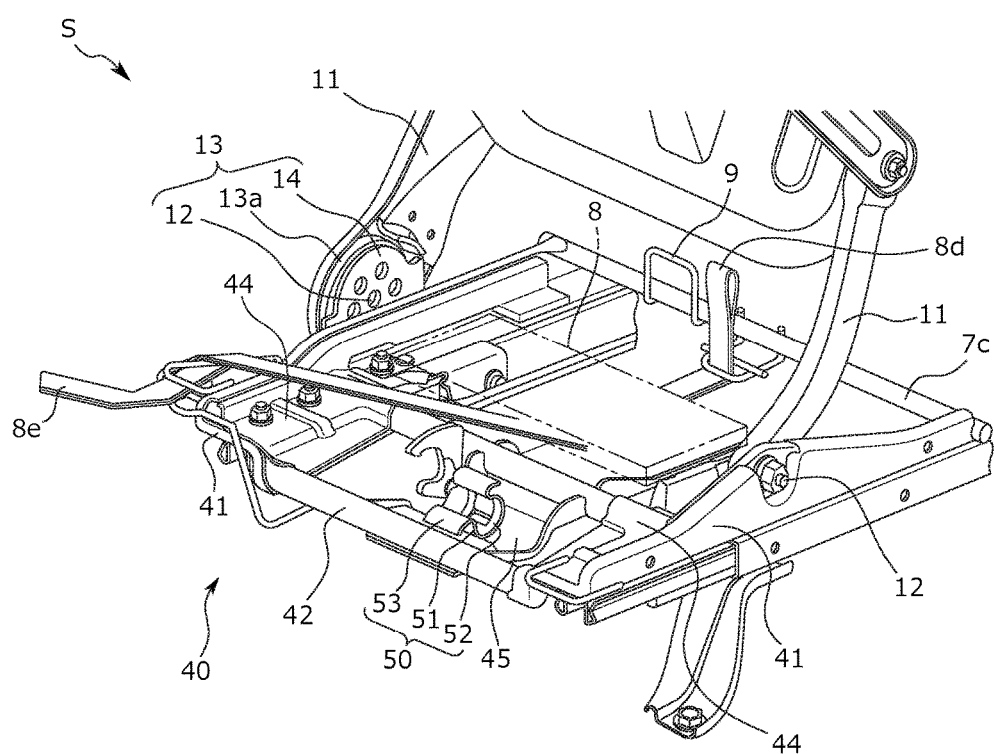
FIG. 4 is a perspective view of a support base of the vehicular seat.
Figure 21A:
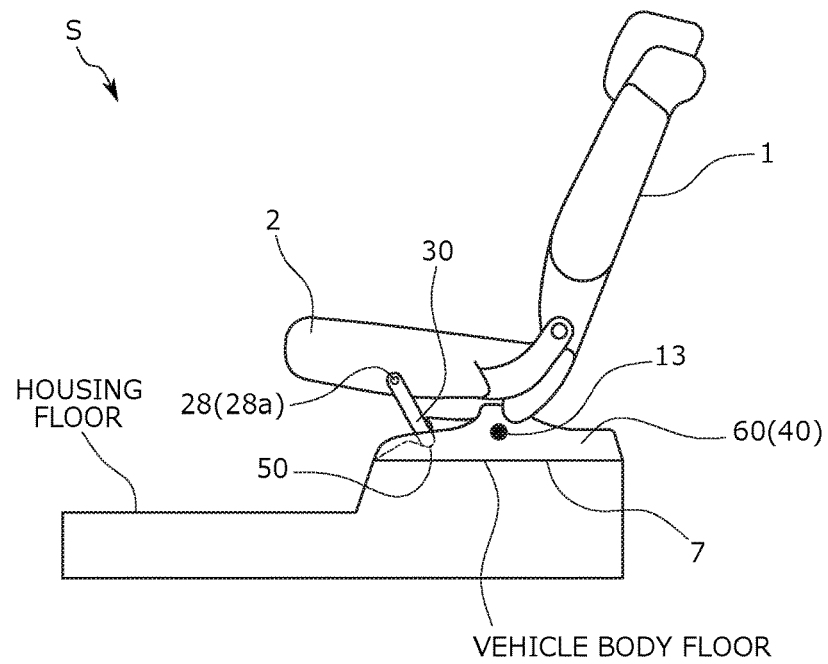
FIG. 21A is a side view of the vehicular seat, and is a view illustrating a moving action from a usage state to a housed state.

A vehicular seat S of the present embodiment is, for example, a rear seat corresponding to a backseat of a vehicle. It should be noted that it is available as a middle seat in the second row in a vehicle including three rows of seats in a vehicle front to back direction. As shown in FIG. 1 and FIG. 2, the vehicular seat S is mainly composed of a seat main body having a seat back 1, a seat cushion 2, and a headrest 3, a detachable leg 30 supporting the seat main body from below, a support base 40 supporting the detachable leg 30 from below, a leg holding member 50 mounted to the support base 40 and detachably holding a lower end of the detachable leg 30, and a base cover 60 covering the support base 40 from above. Moreover, as shown in FIG. 3 and FIG. 4, the vehicular seat S includes right and left rail devices 7 mounted to a vehicle body floor via floor connecting members 6 and supporting the seat main body to be movable in the front to back direction, a rail locking device 8 configured to lock the rail devices 7, and a reclining device 13 pivotably connecting the seat back 1 to the support base 40. Further, in rear portions of the rail devices 7, an anchor member 9 for connecting a child seat is mounted. As shown in FIG. 21A, on the seat front side of the vehicular seat S, a concave housing floor formed at a position lower than the vehicle body floor is provided.

The vehicular seat S is a seat configured for seat arrangements of three kinds of forms: a usage state where the occupant can sit; a housed state where the seat main body is housed in the housing floor; and a tip-up state where the seat main body is flipped up. The vehicular seat S is switched from the usage state shown in FIG. 21A to the housed state shown in FIG. 22C where the seat main body falls forward and is folded and housed in the housing floor when the occupant pulls an operating lever 1c. Moreover, the occupant raises the seat main body upward manually, thereby the vehicular seat S is switched from the housed state to the tip-up state shown in FIG. 23B. Further, when the occupant pulls the detachable leg 30 functioning as an operating portion, the seat cushion 2 rotates downwardly with respect to the seat back 1, and the vehicular seat S returns to the usage state shown in FIG. 24B from the tip-up state. More detail is described below.

As shown in FIG. 1, the seat back 1 is a backrest part supporting the back of the occupant from behind, and is configured by placing a cushion pad 1a on a back frame 10 of FIG. 2 serving as a framework and covering them with a skin 1b. On the upper surface of the seat back 1, the operating lever 1c is arranged on the right side in a seat width direction. In addition, on the left side in the seat width direction of the seat back 1, an armrest 4 for supporting the arm of the sitting occupant is mounted.

The seat cushion 2 is a seating part supporting the occupant from below, and is configured by placing a cushion pad 2a on a cushion frame 20 of FIG. 2 serving as a framework and covering them with a skin 2b from above the cushion pad 2a. On the left side of the seat cushion 2, a buckle 5 for attaching a tongue plate provided at a seat belt (not shown) is mounted. As shown in FIG. 2, the buckle 5 and the reclining device 13 are arranged at opposite positions of the seat main body in the seat width direction relative to each other.

The headrest 3 is a head part supporting the head of the occupant from behind, and is configured by placing a cushion pad 3 on a pillar (not shown) serving as a core material and covering them with a skin 3b. A headrest pillar is generally composed of right and left pillar main body parts, and a pillar connection part connecting the upper ends of the right and left pillar main body parts. In the above configuration, a center position in the seat width direction of the headrest 3 is arranged at the substantially same position as a center position of the seat cushion 2. Therefore, regarding the headrest 3 hardly influencing an arrangement layout in the vehicle, the arrangement giving priority to rigidity of the seat can be set.

As shown in FIG. 2 and FIG. 3, the floor connecting members 6 are mounted in the right and left side portions of the seat, and are arranged in right and left positions overlapping the reclining device 13 in the seat width direction. The floor connecting member 6 includes a front floor connecting member 6a and a rear floor connecting member 6b which are arranged at positions to sandwich the reclining device 13 in the seat front to back direction.

The front floor connecting member 6a is formed of a curved-shaped plate body, and as shown in FIG. 3, one end thereof is overlapped with and bolted to the front portions of right and left lower rails 7a and the other end extends in front of the seat and is bolted on the vehicle body floor. The right front floor connecting member 6a extends in front of the seat to slightly project to the outside in the seat width direction, and is arranged to be inclined on the outside in the seat width direction than the left front floor connecting member 6a.

As shown in FIG. 2 and FIG. 3, the rear floor connecting member 6b is formed of a flat plate-shaped plate body, and one end thereof is mounted to the rear portions of the right and left lower rails 7a and the other end extends to the outside in the seat width direction and is bolted on the vehicle body floor. The rear floor connecting members 6b are arranged between the reclining device 13 and the rear end portion of the support base 40 in the front to back direction.

Figure 7:
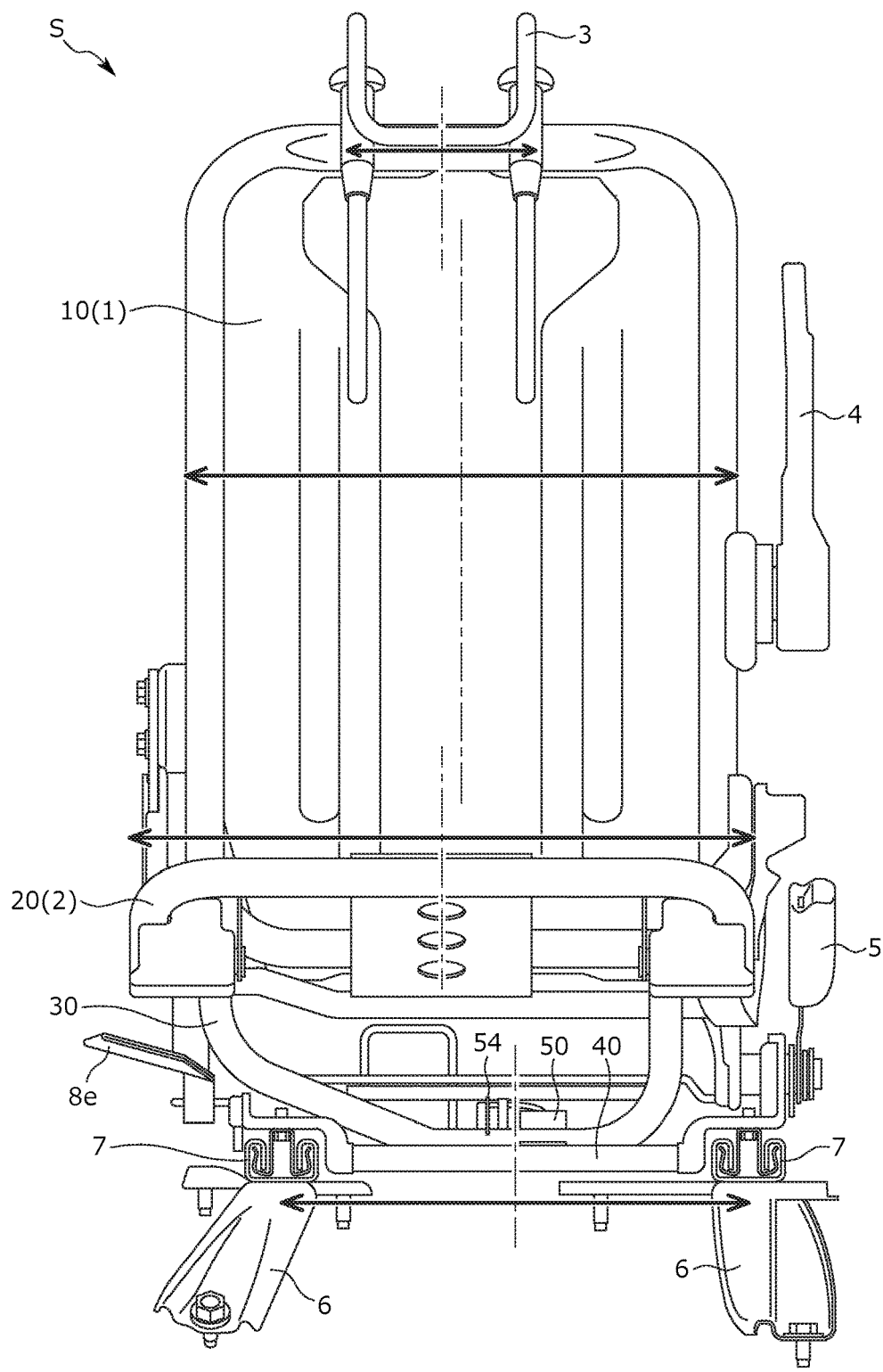
FIG. 7 is a front view of a seat frame.

In the above configuration, as shown in FIG. 7, a center position in the seat width direction of the seat back 1 is arranged to be displaced to the left side in the seat width direction with respect to the center position of the seat cushion 2. Then, center positions in the seat width direction of the pair of floor connecting members 6 are similarly offset-arranged to be displaced to the left side with respect to the center position of the seat cushion 2. Therefore, a seat of which rigidity is secured while taking account of the arrangement layout in the vehicle can be realized.

The rail devices 7 are arranged between the seat main body and the vehicle body floor in the up and down direction, and as shown in FIG. 3, are mainly composed of the right and left lower rails 7a fixed on the vehicle body floor via the floor connecting members 6 and extending in the seat front to back direction, right and left upper rails 7b slidably supported along the lower rails 7a, and a rail connection part 7c connecting the rear portions of the right and left upper rails 7b. On the upper surfaces of the right and left upper rails 7b, the support base 40 is constructed, and as shown in FIG. 4, on the support base 40, a rail locking device 8 configured to lock the upper rails 7b in a state of being supported by the lower rails 7a is mounted. To the rail connection part 7c, the anchor member 9, and a first operation strap 8d arranged in a position adjacent to the anchor member 9 and serving as an operation part of the rail locking device 8 are mounted.

Figure 5:
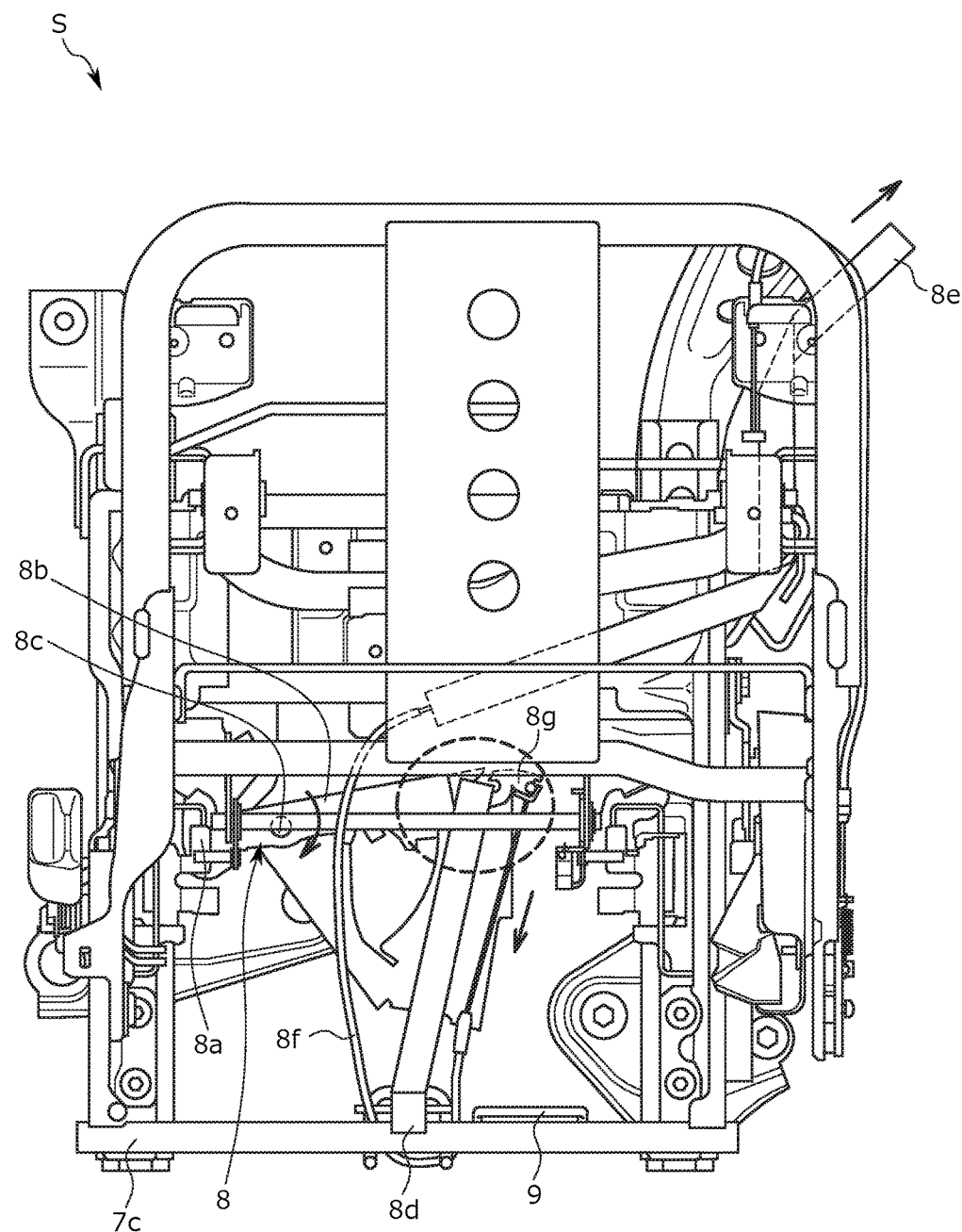
FIG. 5 is a plan view of the support base, and is a view showing a rail locking device.

As shown in FIG. 4 and FIG. 5, the rail locking device 8 is arranged in a front to back position overlapping the reclining device 13 in the seat front to back direction, and is arranged between the right and left upper rails 7b. The rail locking device 8 is mainly composed of a rail locking main body 8a, a pivot bar 8b connecting the rail locking main body 8a and the operation strap and pivoting around a pivot shaft 8c in association with the pulling of the operation strap, and the first operation strap 8d and a second operation strap 8e which are hooked on one end of the pivot bar 8b. Specifically, the first operation strap 8d is hooked in a strap hooking groove 8g provided in one end of the pivot bar 8b. The second operation strap 8e is mounted via a pull cable 8f hooked on one end of the pivot bar 8b.

The rail locking main body 8a is a mechanism configured to release the upper rails 7b from a locked state by connecting the upper rails 7b and the pivot bar 8b and detaching an engaging groove (not shown) provided in the upper rails 7b from an engaging claw (not shown) in association with a pivot motion of the pivot bar 8b. The pivot bar 8b rotatably supports the pivot shaft 8c in the substantially central portion in the longitudinal direction and connects the rail locking main body 8a and the operation strap while sandwiching the pivot shaft 8c.

As shown in FIG. 5, the first operation strap 8d is formed such that one end thereof is hooked in the strap hooking groove 8g and the other end extends in the rear of the seat and is slidably guided to a guide wire provided at the rail connection part 7c, to extend to the upper part of the rail connection part 7c. The second operation strap 8e is formed such that one end thereof is connected to the pull cable 8f and the other end is slidably guided to a guide wire provided on the support base 40, to extend in front of the seat while being slightly inclined to the outside in the seat width direction. The pull cable 8f extends in front of the seat and is connected to the second operation strap 8e in such a manner that one end thereof is hooked in the end portion than the strap hooking groove 8g in the pivot bar 8b and the other end extends in the rear of the seat and is guided to the guide wire of the rail connection part 7c and is turned down.

Figure 6:
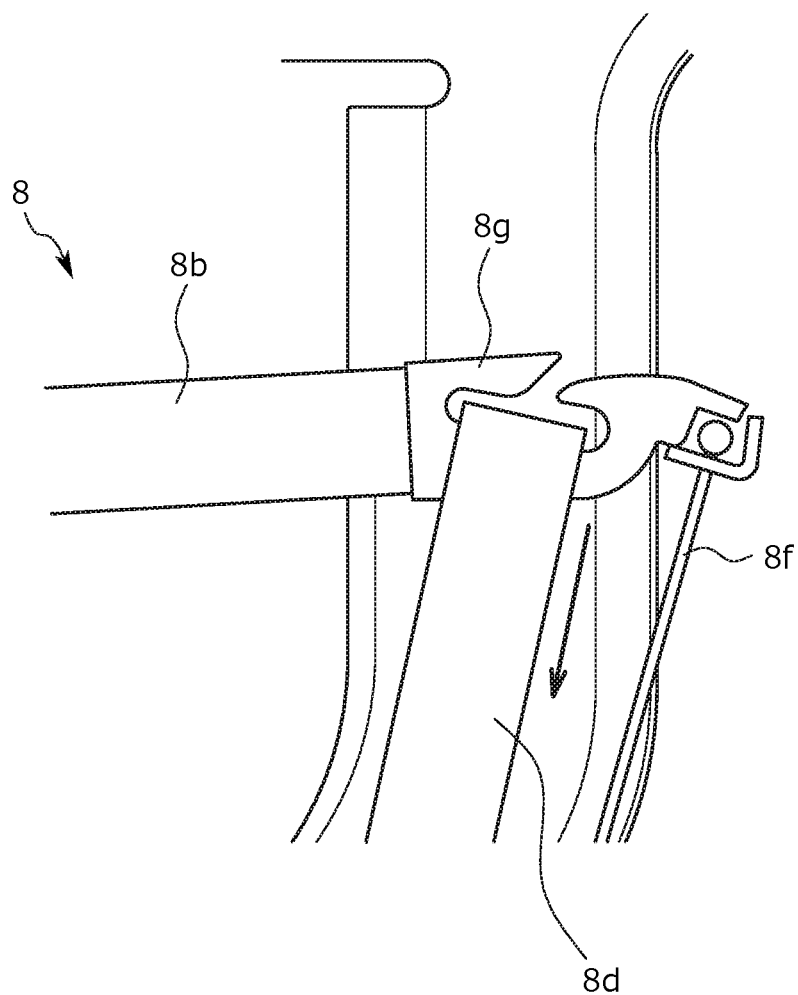
FIG. 6 is an enlarged view of FIG. 5, and is a view showing a strap hooking groove of the rail locking device.

As shown in FIG. 6, the strap hooking groove 8g has a groove space wider than its opening portion. The opening portion of the strap hooking groove 8g has a guide shape for guiding one end of the first operation strap 8d into the groove. The opening portion is formed to be narrower into a taper shape toward the bottom portion in the depth direction of the strap hooking groove 8g. Moreover, the portion on one end side in the longitudinal direction of the pivot bar 8b in the opening portion is partly notched to be recessed in the depth direction than the portion on the other end side, so a step is generated in the opening portion. Therefore, the first operation strap 8d can be easily assembled to the pivot bar 8b, and falling out of the assembled first operation strap 8d can be suppressed.

The anchor member 9 is formed of a substantially C-shaped wire member for connecting a child seat, and is mounted to the front surface of the rail connection part 7c as shown in FIG. 3 and FIG. 4. The anchor member 9 is arranged in a position on the side of the reclining device 13 adjacent to the first operation strap 8d and arranged in the central portions of the right and left upper rails 7b in the seat width direction. Moreover, the anchor member 9 is arranged between the right and left pillar main body parts serving as core materials of the headrest 3 in the seat width direction. The anchor member 9 and the first operation strap 8d are covered with the base cover 60 shown in FIG. 12 from above, and pass through an anchor through hole 72 and a strap through hole 73 which are provided in the base cover 60 and expose upwardly.

The back frame 10 is formed of a substantially rectangular frame-shaped body serving as a framework of the seat back 1, and as shown in FIG. 3, in the lower portion of the right and left outer surfaces of the back frame 10, right and left connecting brackets 11 for connecting it to the support base 40 are mounted. The connecting bracket 11 is formed of a substantially arcuate-shaped sheet metal member extending in the up and down direction, and the upper end of the connecting bracket 11 is mounted to the back frame 10 and the lower end thereof is mounted to the support base 40. In addition, on the right and left inner surfaces of the connecting bracket 11, reinforcing brackets 11a are assembled in order to improve rigidity. On the lower end of the left connecting bracket 11, a seat pivot shaft 12 rotatably supported on the support base 40 along a right and left direction is provided (along the seat width direction), and on the lower end portion of the right connecting bracket 11, the reclining device 13 pivotably connecting the back frame 10 to the support base 40 is mounted. In addition, whereas the right connecting bracket 11 is arranged further to the outside in the seat width direction than the upper rail 7b on the right side, the left connecting bracket 11 is arranged further to the inside in the seat width direction than the upper rail 7b on the left side.

Figure 8:
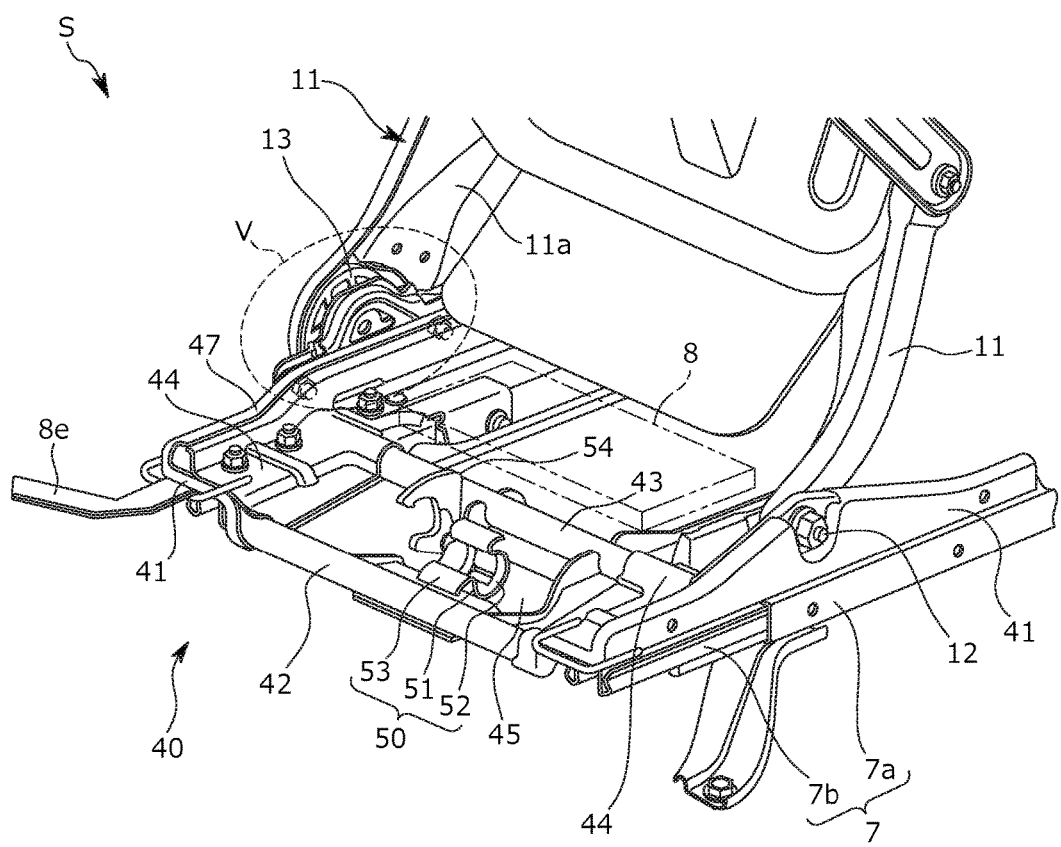
FIG. 8 is a perspective view of the support base of the vehicular seat.
Figure 9:
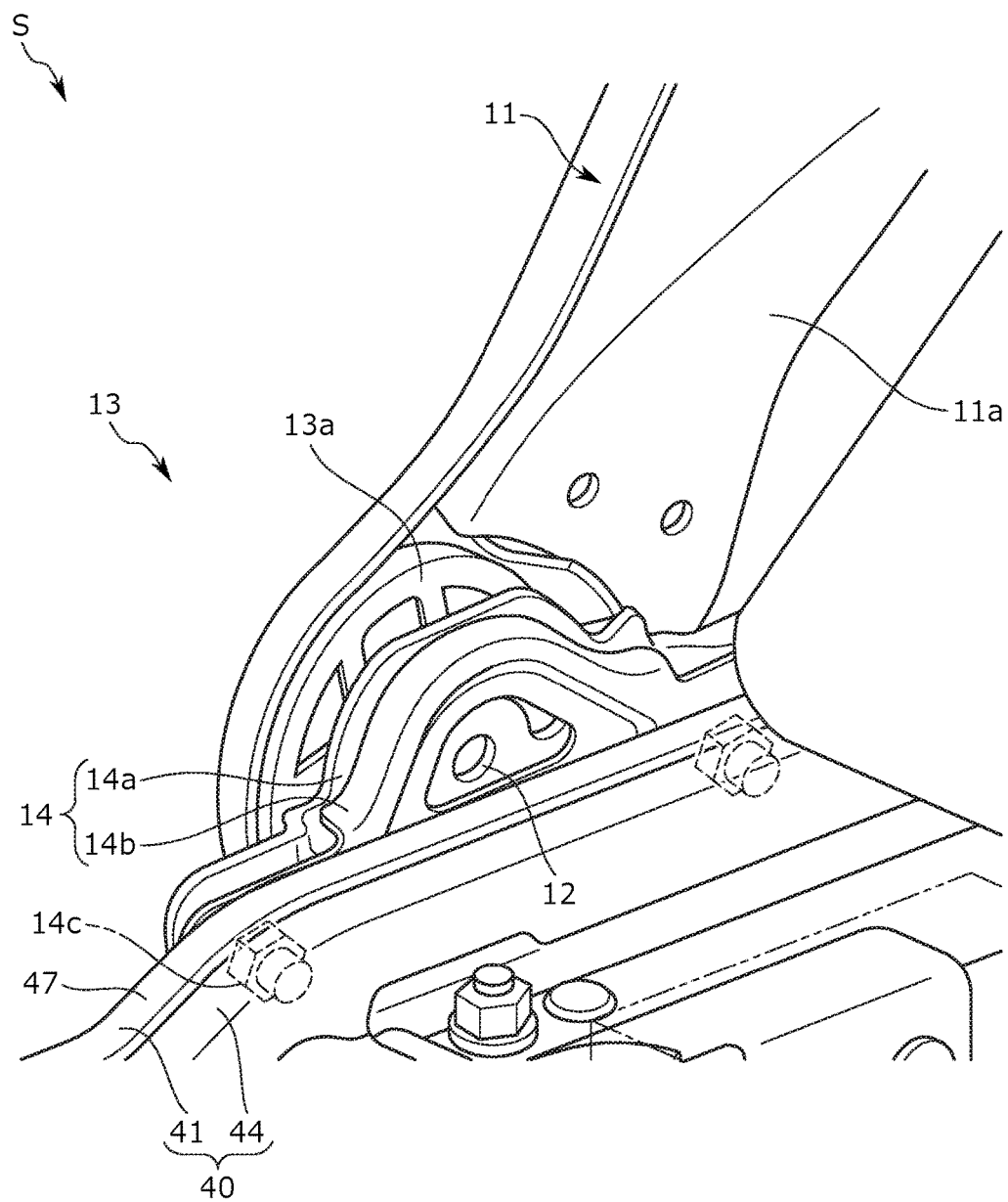
FIG. 9 is an enlarged view of FIG. 8, and is a perspective view showing the periphery of a reclining device.
Figure 10:
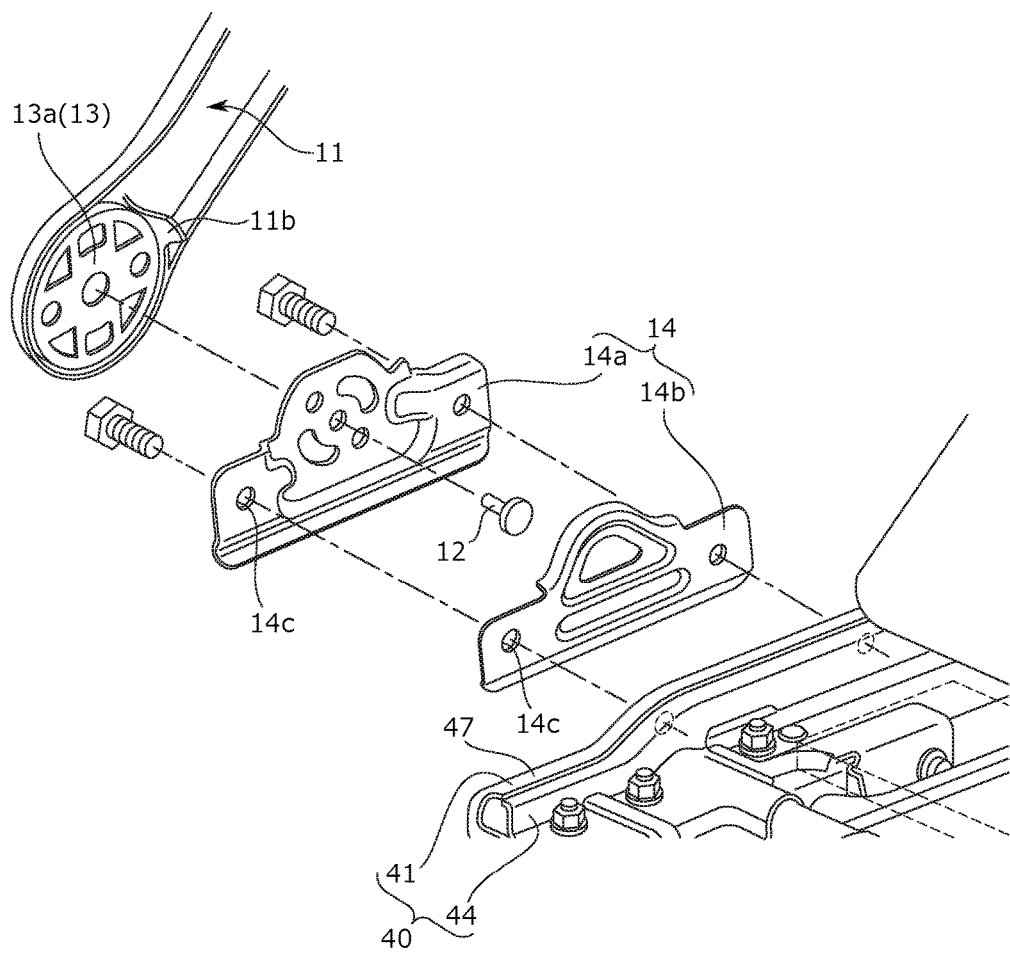
FIG. 10 is an exploded perspective view of FIG. 9.

The reclining device 13 comprises a known device, and as shown in FIG. 8 to FIG. 10, is accommodated in the inner surface in the seat width direction of the right connecting bracket 11 and is assembled to the outer surface of the support base 40 via a reclining mounting bracket 14. Moreover, the reclining device 13 is arranged at a height at least partially overlapping the upper rails 7b in the up and down direction, arranged in the substantially central portion of the upper rails 7b in the seat front to back direction, and arranged on the outside than the right upper rail 7b in the seat width direction.

The reclining device 13 is mainly composed of a reclining main body 13a, the seat pivot shaft 12 serving as a pivot shaft of the reclining device 13, and a spiral spring (not shown) biasing the back frame 10 to rotate around the seat pivot shaft 12 to the front side. The seat pivot shaft 12 is rotatably supported on the connecting brackets 11, the reclining main body 13a, and the reclining mounting bracket 14, in the seat width direction. The spiral spring (not shown) is latched on the back frame 10 side at one end thereof and is latched on the support base 40 side at the other end.

The reclining device 13 is configured to switch to a locked state where the pivot motion of the back frame 10 is locked, the back frame 10 is locked to an inclined attitude in FIG. 1, the locked state is released by operating the operating lever 1c, and the back frame 10 can be rotated towards the front side by a biasing force of the spiral spring and be folded to the vehicle body floor side.

The reclining mounting bracket 14 is a member for mounting the reclining main body 13a on the outer surface of the support base 40, and is formed as a substantially hollow body by assembling an outer bracket 14a and an inner bracket 14b. In the substantially central portion in the seat front to back direction of the reclining mounting bracket 14, a pivot shaft hole for rotatably supporting the seat pivot shaft 12 is formed. Moreover, in the front portion and the rear portion of the reclining mounting bracket 14, bolt assembling parts 14c for assembling it to side base portions 41 of the support base 40 are respectively formed. In addition, a flange part 11b provided at the connecting bracket 11 abuts the upper ends of the outer bracket 14a and the inner bracket 14b and thereby they are positioned relative to each other.

The cushion frame 20 is formed of a substantially rectangular frame-shaped body serving as a framework of the seat cushion 2, and as shown in FIG. 3, is mainly composed of right and left side frames 21 arranged on the right and left sides, a front connecting pipe 22 connecting the front portions of the respective side frames 21, a central connecting pipe 23 connecting the central portions in the front to back direction of the respective side frames, and a plate-shaped pan frame 24 connecting the front connecting pipe 22 and the central connecting pipe 23.

The side frame 21 is formed of a sheet metal member extending in the seat front to back direction, the front portion thereof is connected to the front connecting pipe 22, and to the rear portion thereof, a cushion pivoting device 25 pivotably connecting the cushion frame 20 to the back frame 10 is mounted. In addition, as shown in FIG. 2, in the rear portion of the side frame 21, an outer cushion cover 21a and an inner cushion cover 21b whose longitudinal sections are C-shaped and which cover the side frame 21 to surround it are mounted. The front connecting pipe 22 is formed of a substantially C-shaped pipe member, and on the right and left inner surfaces thereof, a leg pivoting device 28 pivotably connecting the detachable leg 30 to the cushion frame 20 is mounted.

Figure 22A:
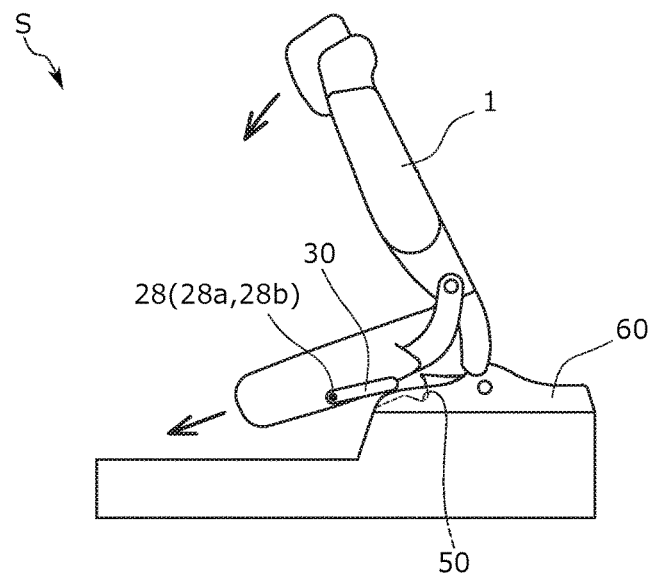
FIG. 22A is a side view of the vehicular seat, and is a view illustrating a moving action to the housed state.
Figure 24A:
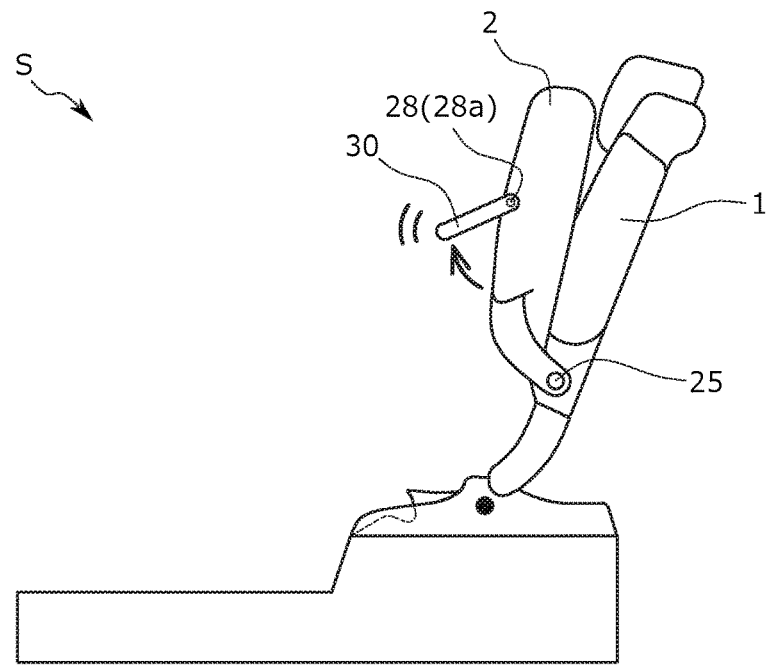
FIG. 24A is a side view of the vehicular seat, and is a view illustrating a return action from the tip-up state to the usage state.

The cushion pivoting device 25 comprises a known device, and as shown in FIG. 3, includes a cushion pivot shaft 26, and a spiral spring 27 biasing the cushion frame 20 to the lower side around the cushion pivot shaft 26. The cushion pivot shaft 26 is rotatably supported on a side of the back frame 10 and a side of the cushion frame 20 along the right and left direction, and the spiral spring 27 is latched on the side of the back frame 10 at one end thereof and is latched on the side of the cushion frame 20 at the other end. The cushion pivoting device 25 is configured to switch to a locked state where the pivot motion of the cushion frame 20 is locked. As shown in FIG. 22C, when the seat main body is housed in the housing floor, in other words, when the back frame 10 is in a state of being folded to the cushion frame 20 side, the cushion pivoting device 25 locks the pivot motion of the cushion frame 20. Then, as shown in FIG. 24A, the locked state is released when the detachable leg 30 functioning as an operating lever is pulled, and the cushion frame 20 can be rotated to the lower side with respect to the back frame 10 by a biasing force of the spiral spring 27.

The leg pivoting device 28 includes a leg pivot shaft 28a, and a spring member 28b biasing the detachable leg 30 to the opposite side to the cushion frame 20 around the leg pivot shaft 28a, in other words, to the direction away from the cushion frame 20. The leg pivot shaft 28a is rotatably supported on the front connecting pipe 22 and the upper end portion of the detachable leg 30 in the right and left direction, and the spring member 28b is latched on the cushion frame 20 side at one end thereof and is latched on the detachable leg 30 side at the other end. The leg pivoting device 28 is configured to switch to a locked state where the pivot motion of the detachable leg 30 is locked, and as shown in FIG. 22A, when the detachable leg 30 is detached from the leg holding member 50 and housed in the cushion frame 20 side, locks the pivot motion of the detachable leg 30. Then, as shown in FIG. 24A, the locked state is released when the locked detachable leg 30 is pulled, and the detachable leg 30 can be moved to a position where it can be attached to the leg holding member 50 to return to the usage state by a biasing force of the spring member 28b.

As shown in FIG. 3, the detachable leg 30 is a substantially C-shaped pipe member supporting the seat cushion 2, and includes leg main body parts 31 arranged on the right and left sides, and a leg connection part 32 connecting the lower ends of the respective leg main body parts 31. The upper ends of the leg main body parts 31 are connected to the right and left inner surfaces in the substantially central portion in the front to back direction of the cushion frame 20, and the substantially central portion in the right and left direction of the leg connection part 32 is detachably held by the leg holding member 50. The upper end portion of the detachable leg 30 projects in front of the seat than the lower end portion of the detachable leg 30, and the detachable leg 30 is upwardly inclined to the front from the lower end portion thereof toward the upper end portion thereof.

Figure 11:
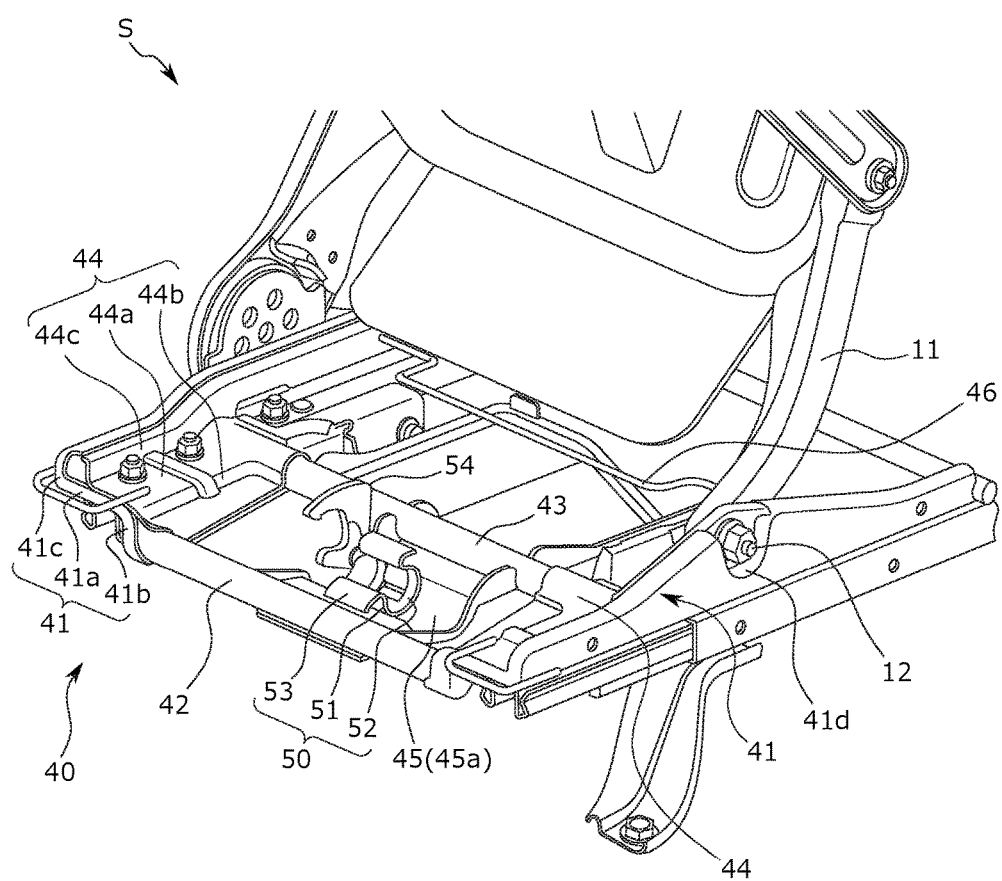
FIG. 11 is a perspective view of the support base of the vehicular seat.

The support base 40 is a member supporting the seat main body, and as shown in FIG. 11, includes the right and left side base parts 41 arranged on the right and left upper rails 7b, a first base connection part 42 connecting the front portions of the respective side base parts 41, a second base connection part 43 connecting the substantially central portions of the respective side base parts 41, right and left reinforcing base parts 44 mounted to the upper surfaces of the respective side base parts 41, a holding member support part 45 connecting the first base connection part 42 and the second base connection part 43 and supporting the leg holding member 50, and a cover fixed frame 46 connecting the side base parts 41 arranged on the right and left in the rear. In addition, as shown in FIG. 7, a center position in the seat width direction of the support base 40 is a substantially same position as a center position of the pair of floor connecting members 6, and is offset-arranged to be displaced to the right side with respect to a center position of the seat cushion 2. Therefore, the load of the sitting occupant can be efficiently received.

The side base part 41 is formed of a substantially eccentric-shaped sheet metal member elongated in the front to back direction, and as shown in FIG. 11, is composed of a support wall part 41a connected to the upper surfaces of the upper rails 4b, an inner wall part 41b bent downwardly from the right and left inner end portions of the support wall part 41a, and an outer wall part 41c bent upwardly from the right and left outer end portions of the support wall part 41a. The first base connection part 42 and the second base connection part 43 are formed of a substantially semicircular pipe member extending in the right and left direction, and separated from each other with a predetermined distance in the front to back direction.

As shown in FIG. 11, the reinforcing base part 44 is formed of a substantially eccentric-shaped sheet metal member elongated in the front to back direction, and is composed of a connecting wall part 44a connected to the upper surfaces of the side base parts 41, an inner wall part 44b bent downwardly from the right and left inner end portions of the connecting wall part 44a, and an outer wall part 44c bent upwardly from the right and left outer end portions of the connecting wall part 44a. The respective right and left end portions of the first base connection part 42 and the second base connection part 43 are connected to the side base parts 41 and the reinforcing base parts 44 to be sandwiched therebetween. The reinforcing base parts 44 overlap the side base parts 41 up and down to form a closed section structure, and the support base 40 is formed into a twin-half shell shape. As shown in FIG. 9, on the outer surface in a portion where the closed section structure is formed, the reclining mounting bracket 14 is assembled. Moreover, in the portion where the closed section structure is formed, a step part 47 recessed to the opposite side (the lower side) to the detachable leg 30 side in a position facing the detachable leg 30 is formed.

Figure 14:
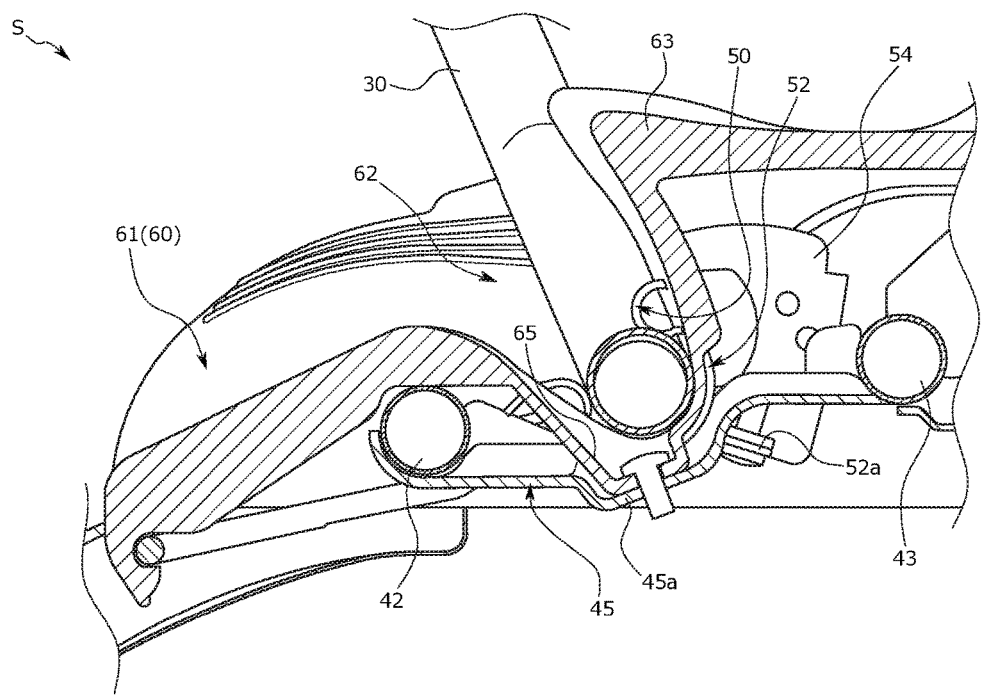
FIG. 14 is a longitudinal sectional view of the base cover and the support base when viewed from the side.

As shown in FIG. 11 and FIG. 14, the holding member support part 45 is a curved sheet metal member supporting the leg holding member 50 and extends in the seat front to back direction, and in the substantially central portion thereof, a concave-shaped folded part 45a recessed downwardly toward the vehicle body floor side opposite to the detachable leg 30 side is formed. The front portion of the holding member support part 45 is mounted to the first base connection part 42, and the rear portion of the holding member support part 45 is mounted to the second base connection part 43. As shown in FIG. 11, on the upper surface of the folded part 45a, the leg holding member 50 is mounted. Moreover, as shown in FIG. 14, in a position to sandwich the leg holding member 50 in the right and left direction, a cover mounting part 65 provided at the base cover 60 is bolted.

The cover fixed frame 46 is a bar-shaped member having a circular cross-section, and in the rear (at least behind the seat pivot shaft 12 constituting the reclining device 13) of the respective side base parts 41, connects the respective side base parts 41. The cover fixed frame 46 is configured to be arranged in the connecting portion of a front cover 61 and a rear cover 71 which form the base cover 60 described below, and the front cover 61 and the rear cover 71 are connected in a state where the cover fixed frame 46 is sandwiched therebetween. This configuration is a main configuration of the present embodiment and thus is described in detail below. It should be noted that, as described above, the cover fixed frame 46 is arranged behind the seat pivot shaft 12 constituting the reclining device 13, thereby the connecting portion of the front cover 61 and the rear cover 71 is difficult to be observed even if the vehicular seat S is displaced, and thus design characteristics are improved. Moreover, the cover fixed frame 46 is a bar-shaped member having a circular cross-section (namely, a round-bar), so assembly is easy because it is rotatable and has a surface without edge when assembling the front cover 61 and the rear cover 71.

As shown in FIG. 3 and FIG. 11, the leg holding member 50 is formed of a substantially U-shaped clip member detachably holding the detachable leg 30, and composed of a pair of side wall parts 51, and a bottom wall part 52 connecting the lower end portions of the respective side wall parts 51. Each side wall part 51 is folded from the lower end portion thereof toward the upper end portion in an adjacent direction to each other, in other words, is folded in the opening part inside direction to narrow the opening portion of the leg holding member 50, and on the upper end portion thereof, a curl part 53 warped in the opening part outside direction is formed.

The bottom wall part 52 is formed into a curved shape, and mounted to the folded part 45a of the holding member support part 45 along it. As shown in FIG. 14, the bottom wall part 52 includes a cut and raised part 52a formed by cutting and raising a portion thereof, and the cut and raised part 52a is hooked in a hooking hole (not shown) formed in the folded part 45a to pass therethrough and is bolted. The pair of curl parts 53 pass through the opening part provided in the base cover 60 respectively and expose to the outside on the detachable leg 30 side.

As shown in FIG. 11 and FIG. 14, the leg holding member 50 is supported by the holding member support part 45 at a position forwardly inclined at a predetermined angle of inclination with respect to a horizontal plane. In other words, the leg holding member 50 is supported by the holding member support part 45 at a position where the opening portion thereof is directed forward and obliquely upward. In a portion adjacent to the leg holding member 50, an inertial locking device 54 locking the leg connection part 32 of the detachable leg 30 in a state of being held by the leg holding member 50 at the time of rear end collision of a vehicle is arranged. The inertial locking device 54 comprises a known device, is mounted to the support base 40, is arranged between the first base connection part 42 and the second base connection part 43 in the front to back direction, and is arranged at a front to back position overlapping the leg holding member 50 in the front to back direction. Moreover, the inertial locking device 54 is arranged in a free space located on the left side in the seat width direction than the center position of the support base 40.

Figure 12:
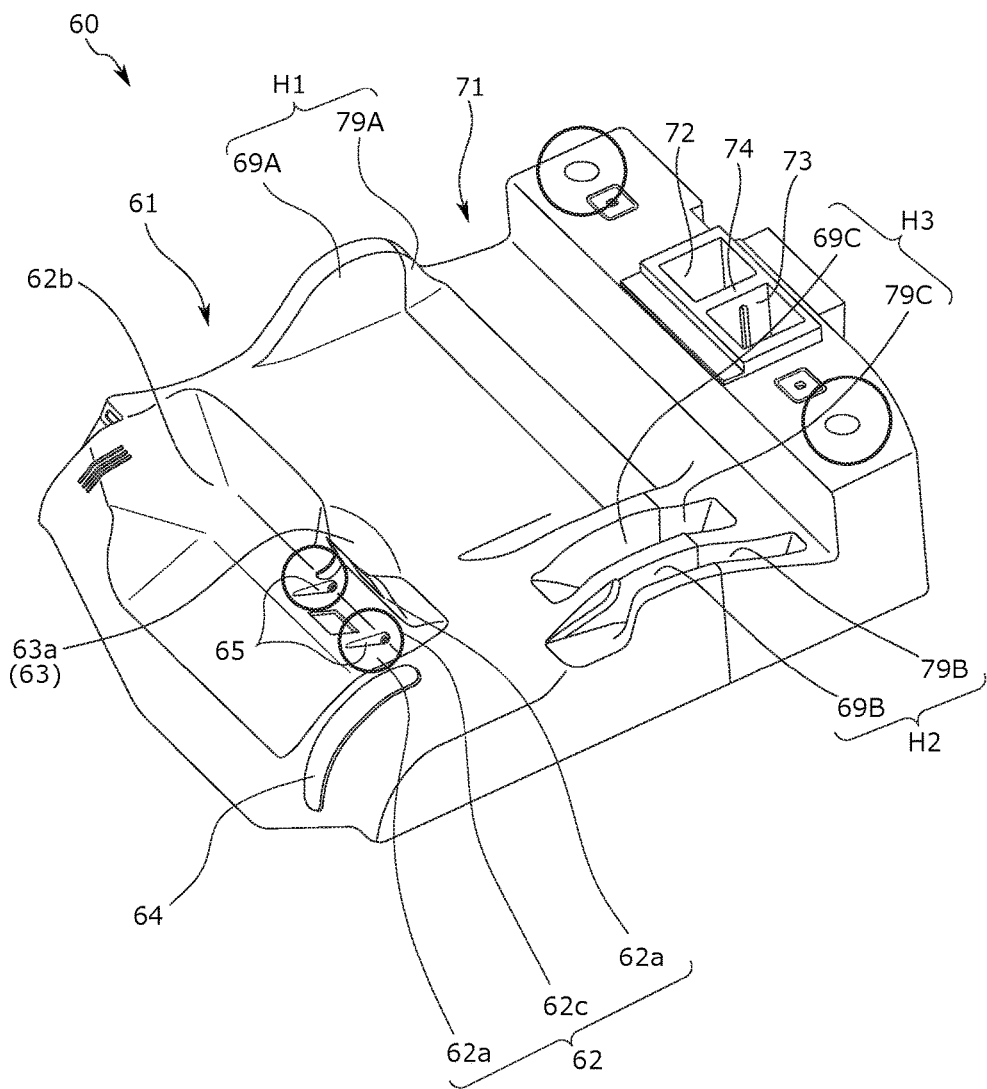
FIG. 12 is a perspective view of a base cover protecting the support base.

The base cover 60 is formed of a resin molded article covering the entire support base 40 from above, and as shown in FIG. 12, is composed of the front cover 61 arranged in the seat front side, and the rear cover 71 arranged at the rear of the front cover 61. The front cover 61 and the rear cover 71 are snap-fit coupled in a state where the cover fixed frame 46 is sandwiched therebetween. The base cover 60 is for covering a drive mechanism arranged in the lower part of the support base 40 and protects the drive mechanism portion.

Front Cover

As shown in FIG. 1 and FIG. 12, the front cover 61 has a guide shape for guiding the detachable leg 30 to move together with the seat main body. More specifically, the front cover 61 includes a leg accommodating concave part 62 accommodating the detachable leg 30, a leg movement restricting part 63 arranged at the rear of the seat than the leg accommodating concave part 62 and restricting the detachable leg 30 from moving behind than the leg accommodating concave part 62, and a pair of base abutting parts 64 arranged in front of the seat than the leg accommodating concave part 62 and configured to abut a portion of the seat cushion 2. Moreover, on the front cover 61, the cover mounting part 65 arranged in the bottom portion of the leg accommodating concave part 62 thereof and configured to be bolted to the support base 40 is formed.

As shown in FIG. 12, the leg accommodating concave part 62 includes a substantially U-shaped concave part recessed toward the lower side from the substantially central portion of the upper surface of the base cover 60, and is formed to extend in the right and left direction. The leg accommodating concave part 62 is composed of a pair of front and rear side wall parts 62a, a pair of right and left side wall parts 62b, and a bottom wall part 62c connecting the lower end portions of these side wall parts, and is arranged at a position where the opening portion thereof is directed forward obliquely upward. The pair of front and rear side wall parts 62a and the pair of right and left side wall parts 62b are, respectively, formed to be wider from the bottom wall part 62c toward the opening portion, and have an inclined surface.

Of the leg accommodating concave part 62, in the central portions in the right and left direction of the pair of front and rear side wall parts 62a, substantially quadrangular opening parts are formed respectively as shown in FIG. 12, and a portion of the leg holding member 50 exposes to the outside via the opening parts from the back surface side of the base cover 60 as shown in FIG. 14. Moreover, in the rear continuous portion of the front and rear side wall parts 62a and the bottom wall part 62c, opening parts elongated in the up and down direction are formed, and a portion of the inertial locking device 54 exposes to the outside via the opening parts from the back surface side of the base cover 60. Further, in the front continuous portion of the front and rear side wall parts 62a and the bottom wall part 62c, the concave-shaped cover mounting part 65 recessed downwardly toward the support base 40 side from the surface of the base cover 60 is formed.

As shown in FIG. 12, the leg movement restricting part 63 includes a portion projecting toward the seat front side from the substantially central portion of the upper surface of the base cover 60, is formed continuously in the rear portion from the leg accommodating concave part 62, and is provided to extend in the seat right and left direction. The upper end of the leg movement restricting part 63 protrudes slightly upwardly from the upper surface of the base cover 60. Therefore, when the detachable leg 30 is accommodated in the leg accommodating concave part 62, the leg movement restricting part 63 restricts the rearward movement of the detachable leg 30 and can guide the detachable leg 30 to the leg accommodating concave part 62 side.

As shown in FIG. 12 and FIG. 14, the cover mounting part 65 includes a substantially circular concave part recessed to the lower side from the upper surface of the base cover 60, and the cover mounting parts 65 are spaced in the seat width direction and formed in pairs, and are bolted to the holding member support part 45 in a state of abutting it. Specifically, the lower end portions of the cover mounting parts 65 are mounted to the folded part 45a recessed downwardly in the holding member support part 45.

Each of the cover mounting parts 65 is arranged in a front to back position overlapping the leg holding member 50 in the seat front to back direction, and at least the opening portion projects in front of the seat than the leg holding member 50. Moreover, each cover mounting parts 65 is arranged in a position to sandwich the leg holding member 50 in the seat width direction, and the cover mounting part 65 on the right side is arranged between the leg holding member 50 and the inertial locking device 54.

Figure 13:
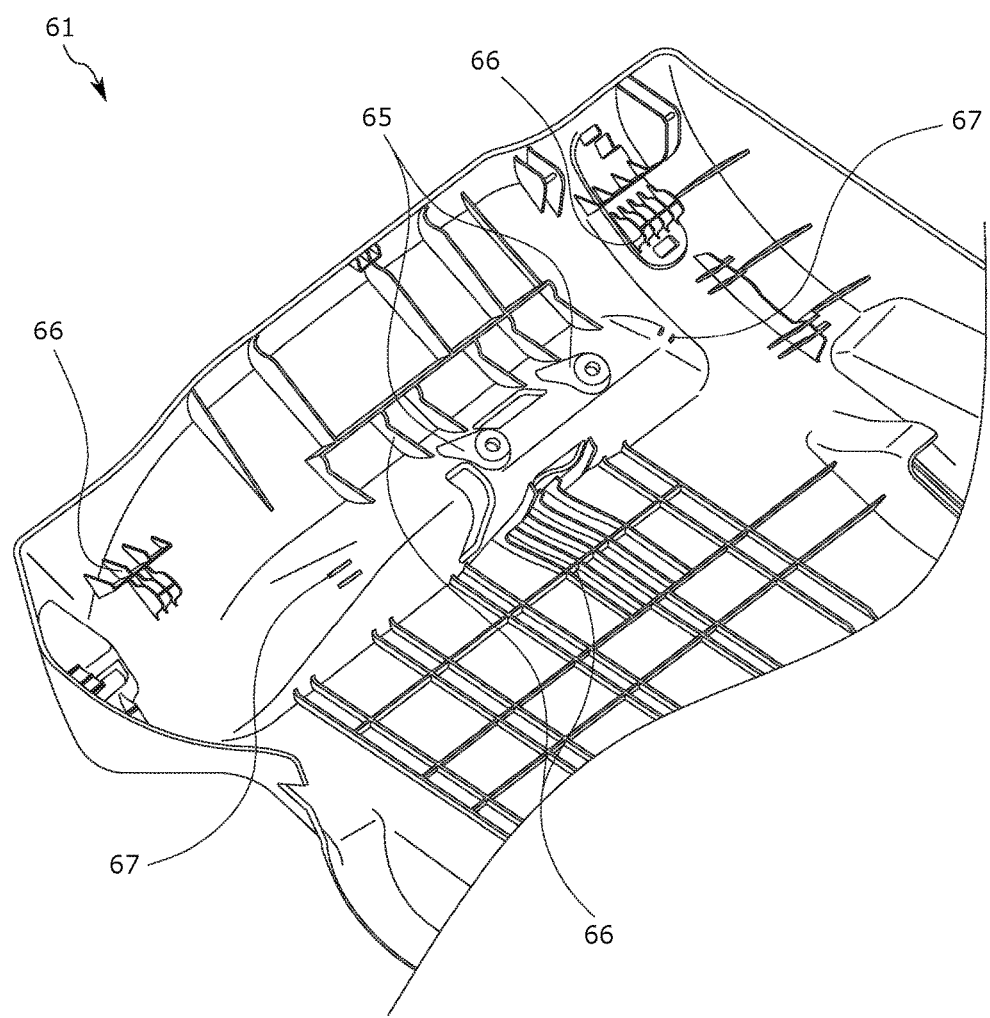
FIG. 13 is a perspective view of the base cover when viewed from the back side.

In the base cover 60, as shown in FIG. 13, on each back surface of the leg accommodating concave part 62, the leg movement restricting part 63, and the cover mounting part 65, a reinforcing rib 65 having a predetermined shape is formed. Therefore, of the base cover 60, a backside portion contacting other component parts has a shape with increased support rigidity.

Moreover, in the above base cover 60, as shown in FIG. 13, a pair of abutting ribs 67 are formed to sandwich the cover mounting parts 65 in the back surface of the leg accommodating concave part 62. The abutting ribs 67 extend along the inclined surfaces of the right and left side wall parts 62b, of the leg accommodating concave part 62, and protrude to abut the support base 40. Therefore, the base cover 60 is easily fitted into the support base 40.

Moreover, on the rear end side of the front cover 61, a front side connection part 68 is formed. The front side connection part 68 is a mechanism for connecting the rear cover 71. The front side connection part 68 is configured to have a plurality of first front locking claws 68a and a plurality of second front locking claws 68b. The first front locking claw 68a is a substantially rectangular claw, and is formed in a position slightly in front of the rear end portion of the front cover 61. The first front locking claw 68a protrudes toward the lower part of the vehicle body in an inclined state such that the free end side is arranged further to the rear end side than the base end side (it protrudes upwardly in FIG. 5 because the lower surface side is shown in the upper part in this figure.). Then, the plurality of first front locking claws 68a are provided in a protruding manner at regular intervals along the rear end line of the front cover 61.

Moreover, the second front locking claw 68b is a substantially rectangular claw, and protrudes toward the lower part of the vehicle body in an inclined state such that the free end side is arranged further to the rear end side than the base end side (it protrudes upwardly in FIG. 5 because the lower surface side is shown in the upper part in this figure.). It should be noted that in the present embodiment, the second front locking claw 68b is formed into a size slightly smaller than the first front locking claw 68a. Particularly, the height of the second front locking claw 68b (the distance from the base end part of the front cover 61 to the free end) is configured to be smaller than the height of the first front locking claw 68a, thereby improving assembly performance to the rear cover 71.

The plurality of second front locking claws 68b are provided in a protruding manner at regular intervals along the rear end (the edge portion) of the front cover 61, and individual second front locking claws 68b are configured to be arranged between the adjacent first front locking claws 68a, 68a (in the halfway point between the adjacent first front locking claws 68a, 68a in the width direction). Thereby, accuracy of assembling position and rigidity can be improved.

It should be noted that, in the present embodiment, although an example where five first front locking claws 68a are formed and four second front locking claws 68b are formed is shown, the number is, of course, not limited thereto and can be changed in other embodiments. Moreover, in a surface facing the rear side of the first front locking claw 68a, three front ribs R1 extending from the base end side to the free end side are formed (on both sides in the width direction and between them), thereby enhancing rigidity. Similarly, in a surface facing the front side of the second front locking claw 68b, two front ribs R1 extending from the base end side to the free end side are formed (on both sides in the width direction), thereby enhancing rigidity.

Moreover, on the rear end side of the front cover 61, in one end portion in the width direction, a circular cup-shaped front side reclining device arrangement part 69A is formed where the reclining device 13 is arranged. Moreover, on the other end side in the width direction, a front side seat belt buckle supporting member through hole 69B and a front side connecting bracket through hole 69C are formed sequentially from the outside. Moreover, in the outside portion of the front side seat belt buckle supporting member through hole 69B, front side part fitting holes 69D are formed. In the present embodiment, two substantially rectangular holes are formed in parallel in the up and down direction, and into the front side part fitting holes 69D, rear side part fitting claws 79D formed at the rear cover 71 are fitted.

Rear Cover

Figure 15:
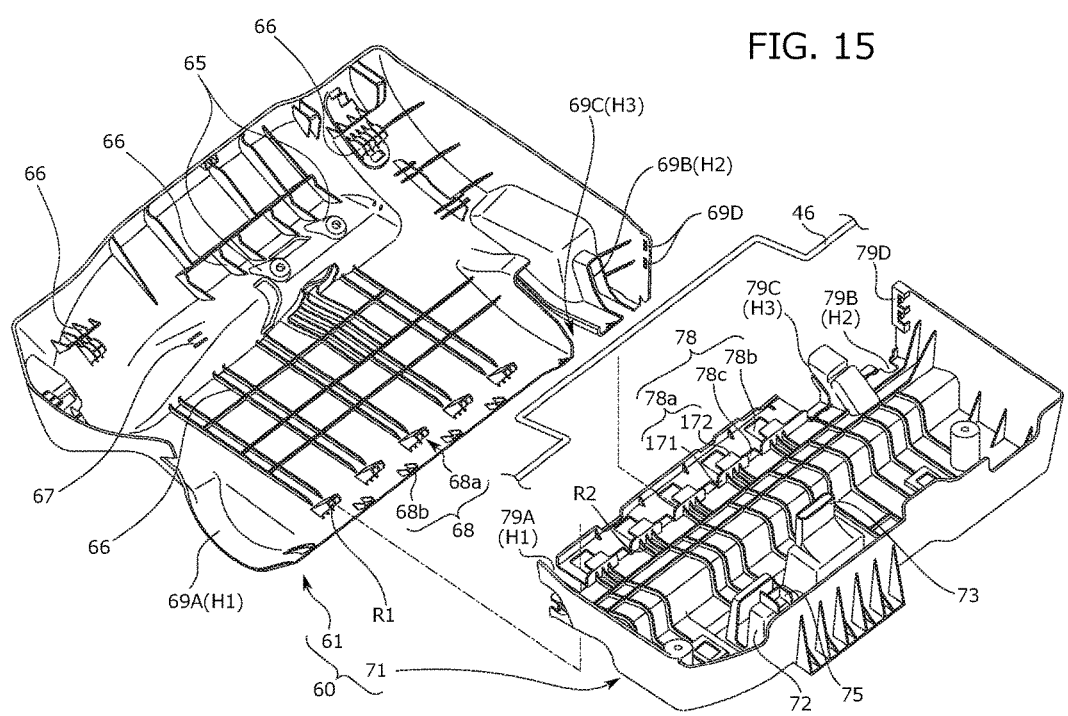
FIG. 15 is an exploded perspective view of the base cover when viewed from the back side.

The rear cover 71 is a cover covering the anchor member 9 and the first operation strap 8d from above, and includes the anchor through hole 72 for passing the anchor member 9 therethrough, the strap through hole 73 for passing the first operation strap 8d therethrough, and a dividing wall part 74 dividing between the anchor member 9 and the first operation strap 8d. As shown in FIG. 15, the respective outer edge portions of the anchor through hole 72 and the strap through hole 73 extend downwardly along the extending direction of the first operation strap 8d. Moreover, on the bottom surface of the outer edge portion of the anchor through hole 72, reinforcing ribs 75 extending downwardly from the bottom surface and abutting the rail connection part 7c of FIG. 4 are formed.

In the above configuration, the respective outer edge portions of the anchor through hole 72 and the strap through hole 73 are formed to abut the rail connection part 7c. Therefore, positioning of the base cover 60 is facilitated, and assembly performance is improved.

Figure 16:
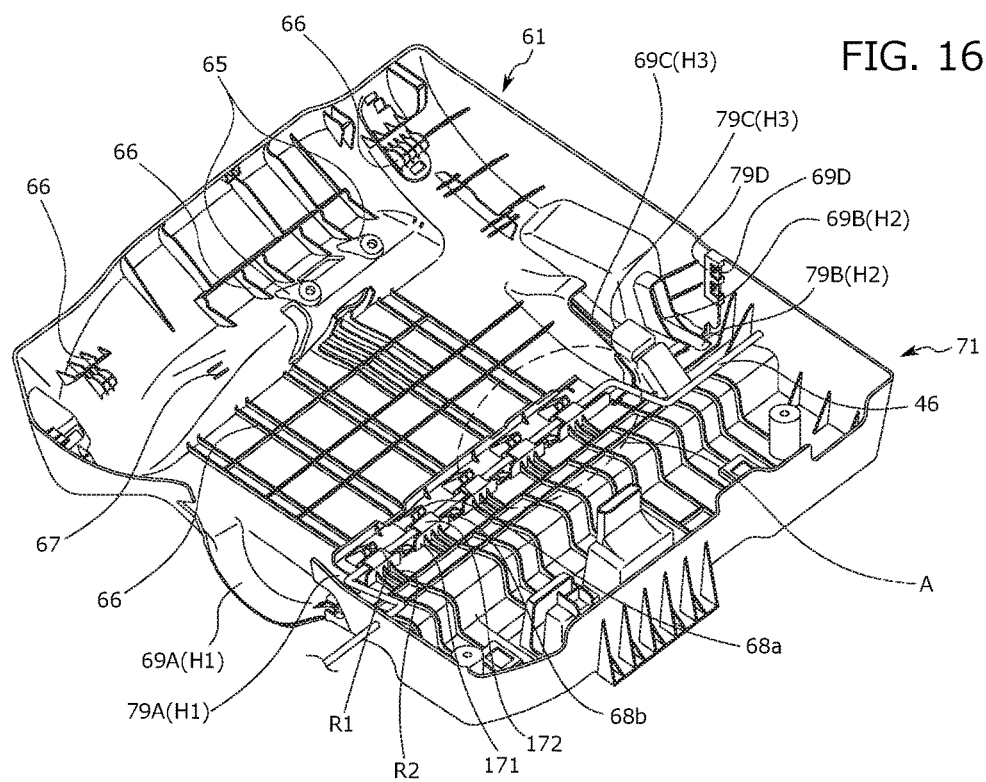
FIG. 16 is an explanatory drawing showing an assembled state of the base cover.
Figure 17:
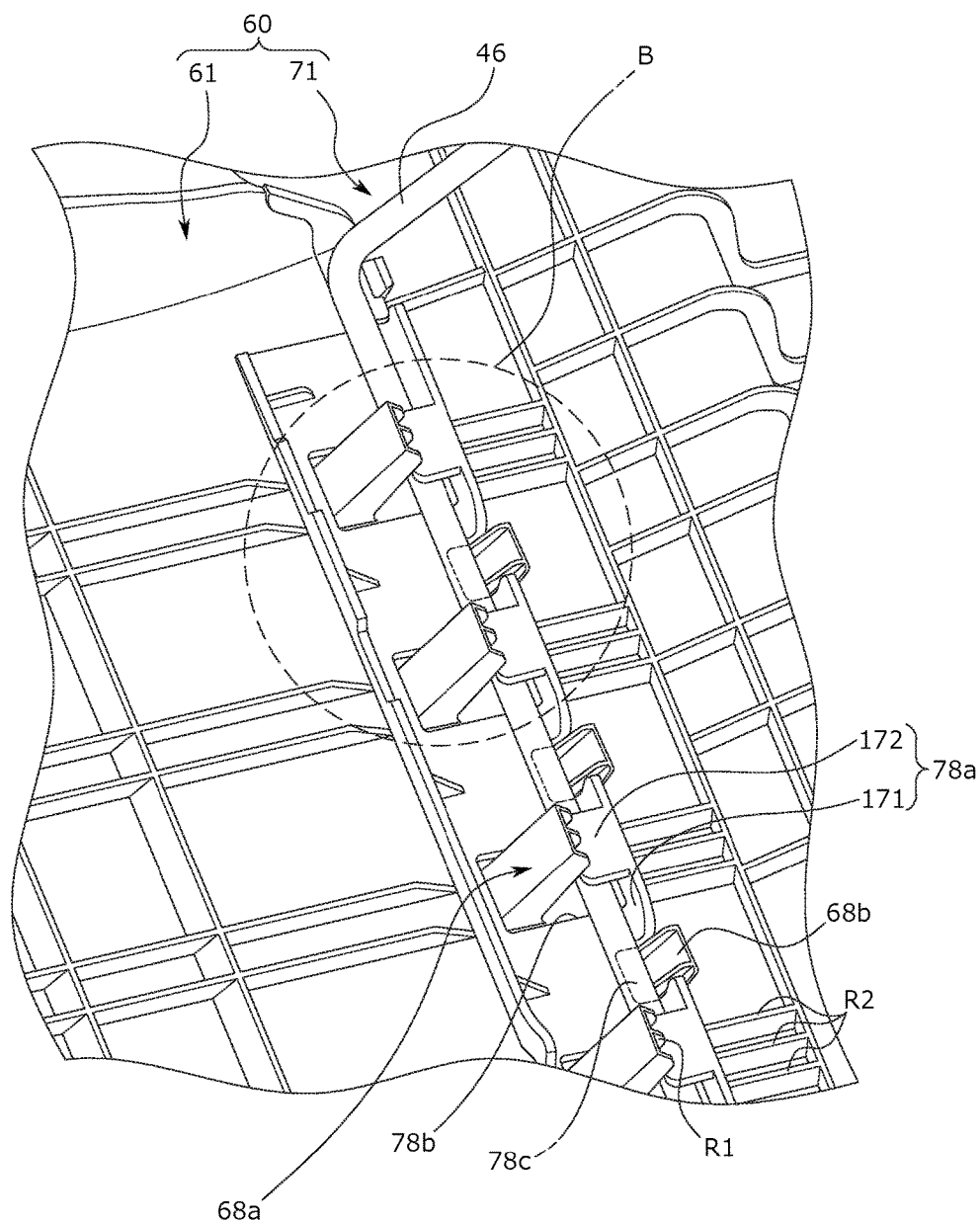
FIG. 17 is an enlarged view of a portion A in FIG. 16.

Moreover, as shown in FIGS. 15 to 17, the rear cover 71 is a bottomed box-shape which is connected to the front cover 61 and covers the rear side. On the front end side of the rear cover 71, a rear side connection part 78 is formed and is a mechanism for connecting the front cover 61. The rear side connection part 78 is configured by having a plurality of rear locking claws 78a, a plurality of first front locking claw through holes 78b, and a plurality of second front locking claw through holes 78c. The plurality of rear locking claws 78a are formed in parallel in a position slightly in front of the front end part of the rear cover 71. The rear locking claw 78a is formed into a substantially L-shape viewed from the side by a substantially rectangular rear locking claw hanging piece 171 protruding toward the lower part of the vehicle body from the rear cover 71, and a rear locking claw pressing piece 172 protruding substantially perpendicularly to the rear locking claw hanging piece 171 toward the front part from the rear locking claw hanging piece 171.

It should be noted that, in the present embodiment, the length in the width direction of the rear locking claw pressing piece 172 is configured to be smaller than the length in the width direction of the rear locking claw hanging piece 171, and the rear locking claw pressing piece 172 protrudes from the vicinity of the center in the width direction of the rear locking claw hanging piece 171. This is, by increasing the width of the base end side, for enhancing rigidity of a portion to which high load is applied at the time of assembly. Moreover, it should be noted that the width of the rear locking claw pressing piece 172 is configured to be the same as or slightly larger than the length in the width direction of the first front locking claw 68a. This is for efficiently receiving the pressing load from the first front locking claw 68a when assembled. Further, in the inner corner of the surface side facing the rear part of the rear locking claw hanging piece 171 and the base end part, three rear ribs R2 extending in the front to back direction from the up and down direction over the inner corner are formed (on both sides in the width direction and between them), thereby enhancing rigidity.

Moreover, the plurality of front locking claw through holes 78b are rectangular holes formed in the vicinity of the front end edge part of the rear cover 71, and are formed in parallel at regular intervals along the front end edge of the rear cover 71. The first front locking claw through holes 78b are formed at positions where the first front locking claws 68a pass therethrough when assembled, and the first front locking claw through holes 78b guide the first front locking claws 68a to the free end of the rear locking claw pressing piece 172.

Further, the plurality of second front locking claw through holes 78c are rectangular holes formed at positions slightly at the rear of the front end part of the rear cover 71, and are formed in parallel at regular intervals along the front end edge of the rear cover 71. Moreover, individual second front locking claw through holes 78c are configured to be arranged between the adjacent first front locking claw through holes 78b, 78b (in the halfway point between the adjacent first front locking claw through holes 78b, 78b in the width direction), and these second front locking claw through holes 78c are formed at positions where the second front locking claws 68b pass therethrough when assembled. Thereby, accuracy of assembling position and rigidity can be improved.

It should be noted that, in the present embodiment, although an example where five rear locking claws 78a and first front locking claw through holes 78b are formed and four second front locking claw through holes 78c are formed is shown in conformity with the configuration of the front cover 61, the number is, of course, not limited thereto and can be changed in other embodiments.

Moreover, on the rear end side of the rear cover 71, in one end portion in the width direction, a rear side reclining device arrangement part 79A is formed where the reclining device 13 is arranged. Moreover, on the other end side in the width direction, a rear side seat belt buckle supporting member through hole 79B and a rear side connecting bracket through hole 79C are formed sequentially from the outside. When assembled, these are combined with the front side reclining device arrangement part 69A, the front side seat belt buckle supporting member through hole 69B, and the front side connecting bracket through hole 69C, and constitute a reclining device arrangement part H1, the seat belt buckle supporting member through hole H2, and a connecting bracket through hole H3.

Further, in the outside portion of the rear side seat belt buckle supporting member through hole 79B, the rear side part fitting claws 79D are formed. In the present embodiment, two substantially rectangular claws protruding in the inside direction are formed in parallel in the up and down direction, and the rear side part fitting claws 79D fit into the front side part fitting holes 69D formed in the front cover 61. By further adopting such a fitting configuration, positioning of the front cover 61 and the rear cover 71 is further facilitated. Moreover, by forming such a fitting configuration in proximity to the seat belt buckle supporting member through hole H2 and the connecting bracket through hole H3 which are constituted as hole parts, rigidity of that portion can be improved.

Combination Method

Next, a method of combining the front cover 61 and the rear cover 71 which are configured as described above to constitute the base cover 60 is described with reference to FIG. 15 to FIG. 19A. Initially, as shown in FIG. 15, the base cover 60 is divided into the front cover 61 and the rear cover 71. Finally, as shown in FIG. 16 and FIG. 17, the front cover 61 and the rear cover 71 are engaged and fixed in a state where the cover fixed frame 46 is sandwiched between the first front locking claw 68a and the second front locking claw 68b which are formed on the rear end side of the front cover 61, and the rear locking claw 78a (the rear locking claw pressing piece 172) which is formed on the front end side of the rear cover 71. At this time, the arrangement positional relationship between the rear locking claw 78a (the rear locking claw pressing piece 172) which is formed on the front end side of the rear cover 71 and the cover fixed frame 46 is shown in FIG. 18A, and the arrangement positional relationship between the first front locking claw 68a and the second front locking claw 68b which are formed on the rear end side of the front cover 61 and the cover fixed frame 46 is shown in FIG. 18B, respectively.

Figure 18A:
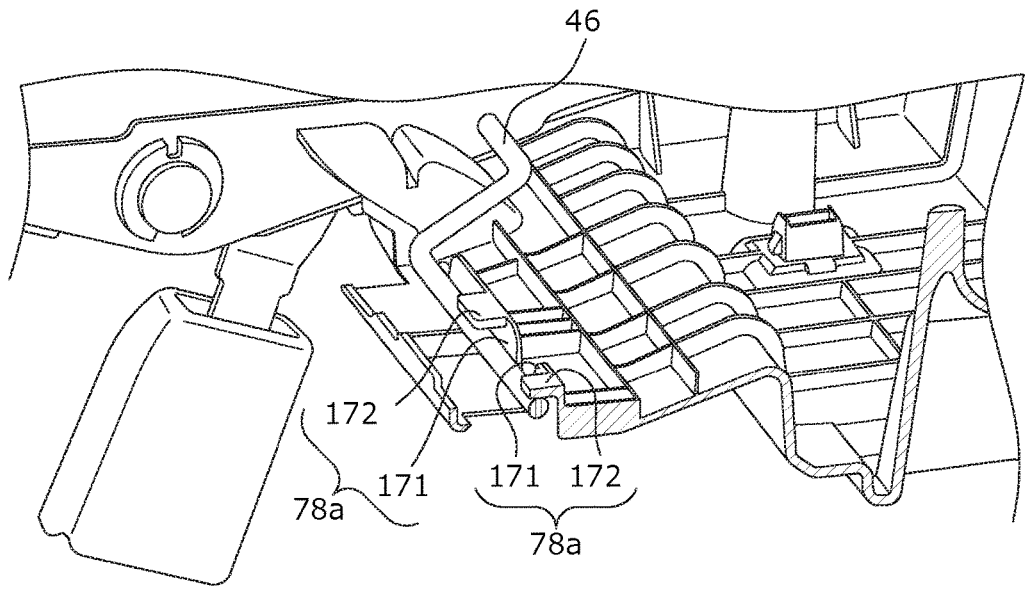
FIG. 18A is an explanatory drawing showing a connected state of a front base cover and a rear base cover.
Figure 18B:
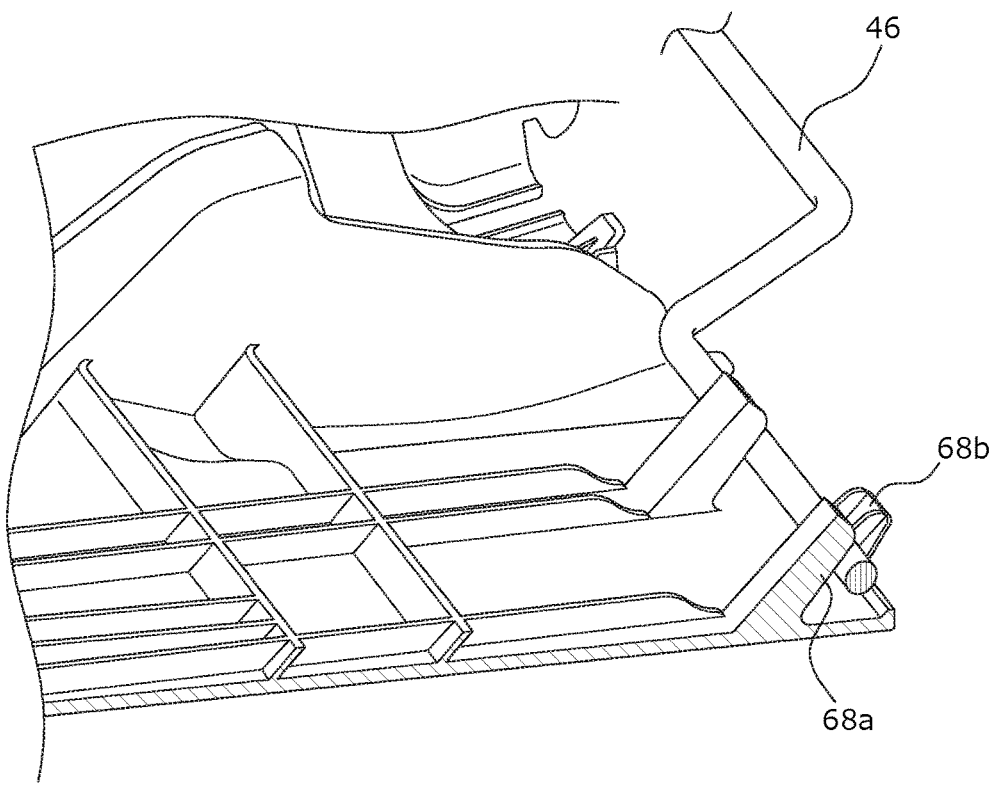
FIG. 18B is an explanatory drawing showing the connected state.

In one example, firstly, as shown in FIG. 18A, the rear locking claw 78a (the rear locking claw pressing piece 172) formed on the front end side of the rear cover 71 is arranged on the cover fixed frame 46. Namely, the cover fixed frame 46 is set to be arranged in the inner corner portion of the rear locking claw hanging piece 171 and the rear locking claw pressing piece 172 which constitute the rear locking claw 78*a* (namely, the cover fixed frame 46 is covered with the rear locking claw hanging piece 171 and the rear locking claw pressing piece 172).

Subsequently, the first front locking claw 68*a* of the front cover 61 is passed through the first front locking claw through hole 78*b* of the rear cover 71 from the upper part of the vehicular seat toward the lower part, and at the same time, the second front locking claw 68*b* of the front cover 61 is passed through the second front locking claw through hole 78*c* of the rear cover 71 from the upper part of the vehicular seat toward the lower part. Thereby, the free end side of the first front locking claw 68*a* presses the free end part of the rear locking claw pressing piece 172 constituting the rear locking claw 78*a* from the lower part of the vehicular seat. Further, thereby, the cover fixed frame 46 arranged in the inner corner portion of the rear locking claw hanging piece 171 and the rear locking claw pressing piece 172 is pressed upwardly by the rear locking claw pressing piece 172 to which a pressing force of the first front locking claw 68*a* is applied. Therefore, the cover fixed frame 46 is firmly pushed against the back surface of the rear cover 71 by the rear locking claw pressing piece 172. In this way, the cover fixed frame 46 may be firmly sandwiched, and after all, the front cover 61 and the rear cover 71 may be firmly fixed to the cover fixed frame 46.

Figure 19A:
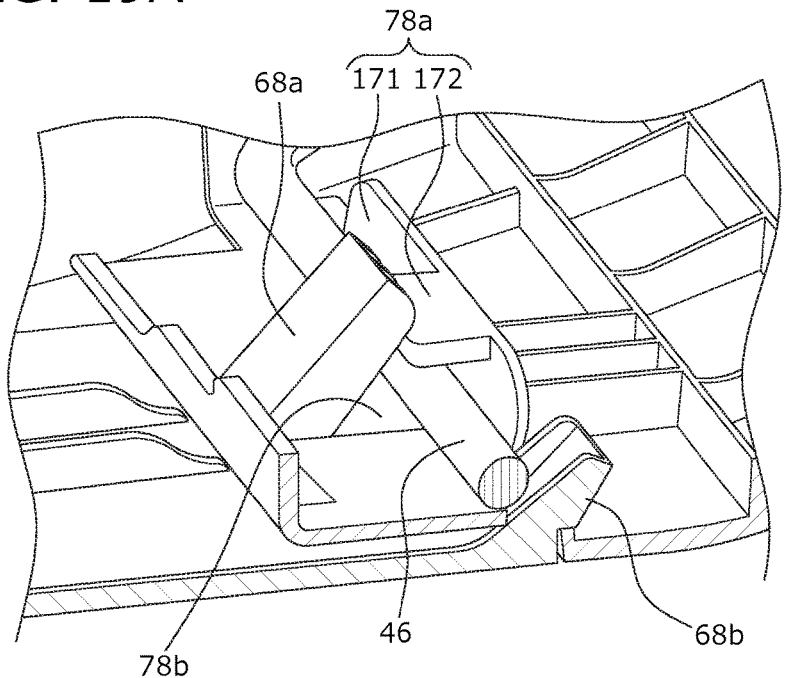
FIG. 19A is an enlarged view of a portion B in FIG. 17.
Figure 19B:
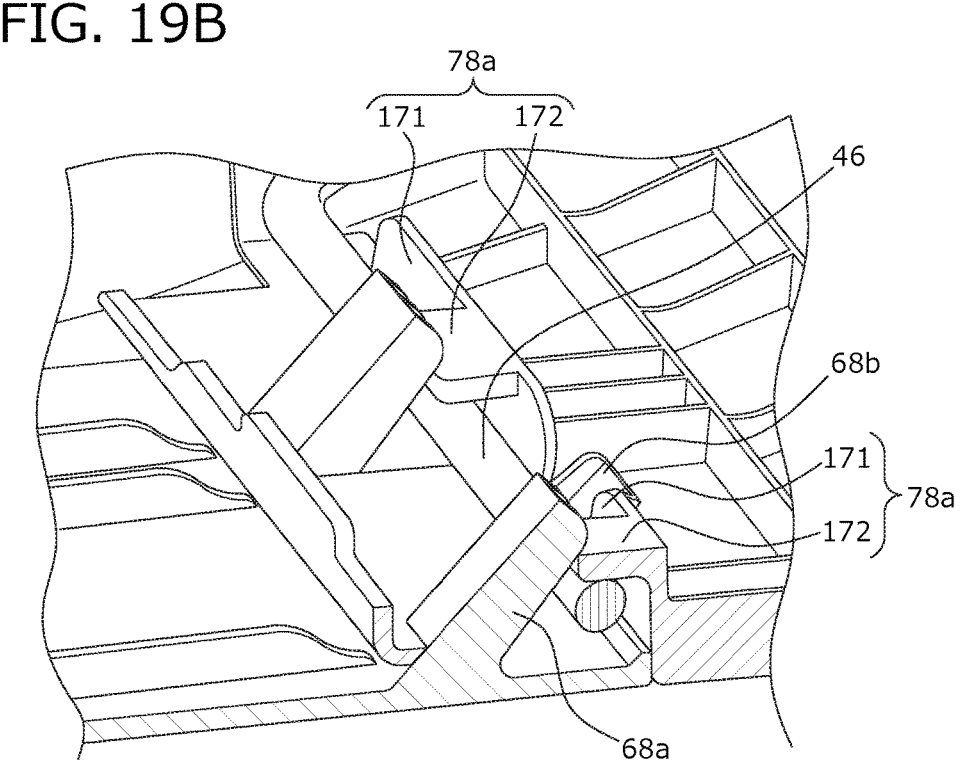
FIG. 19B is an enlarged view of the portion B in FIG. 17.

Moreover, at this time, the front second locking claw 68*b* is pressed against the cover fixed frame 46 between the adjacent first front locking claws 68*a*, 68*a* and the rear locking claws 78*a*, 78*a* (between each combined shape), and defines the rear position of the cover fixed frame 46 and further applies an engaging force. It should be noted that a detail view in a fixed state where the cover fixed frame 46 is sandwiched in this manner between the first front locking claw 68*a* and the second front locking claw 68*b* which are formed on the rear end side of the front cover 61 and the rear locking claw 78*a* (the rear locking claw pressing piece 172) which is formed on the front end side of the rear cover 71 is shown in FIG. 19. Then, a back view (a completed back view) in a state where the front cover 61 and the rear cover 71 are combined to constitute the base cover 60 is shown in FIG. 16.

It should be noted that the connecting portion of the front cover 61 and the rear cover 71 is configured to be arranged in the connecting portion of the lower end of the connecting bracket and the support base 40 (in the vicinity where the seat pivot shaft 12 is arranged) and in an arrangement portion of the seat belt buckle supporting member (not shown) (see FIG. 1 and FIG. 3, FIG. 16 to FIGS. 18A, 18B). Namely, they are configured to be able to be separated from that position, and therefore the base cover 60 can be mounted after the respective frames are assembled. Therefore, the degree of freedom of working sequence is increased and workability is improved.

Figure 20A:
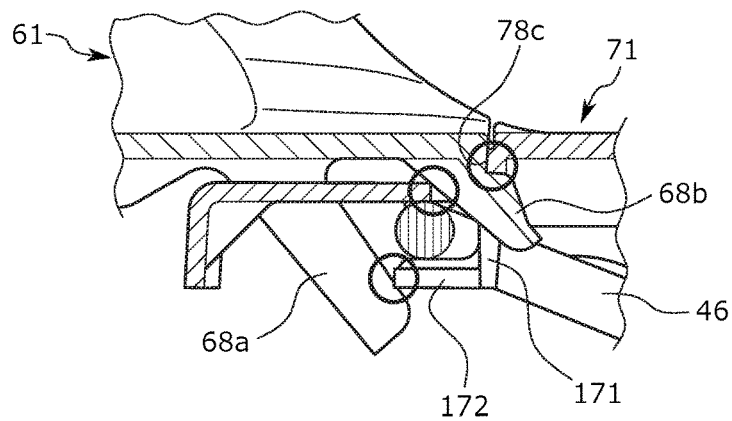
FIG. 20A is an explanatory drawing showing details of connection parts of the front base cover and the rear base cover.
Figure 20B:
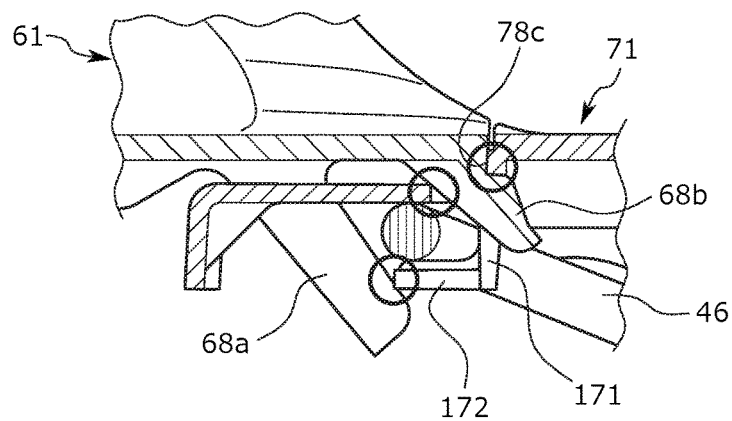
FIG. 20B is an explanatory drawing showing the details of the connection parts.
Figure 20C:
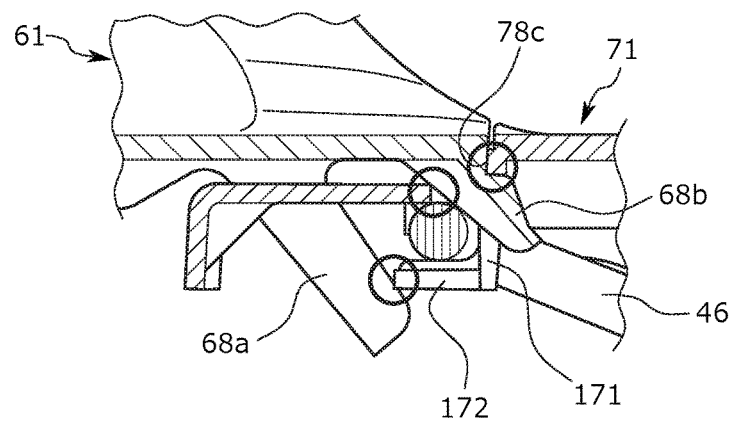
FIG. 20C is an explanatory drawing showing the details of the connection parts.

Moreover, in the present embodiment, when mounting the base cover 60 to the support base 40, fastening by a tapping screw is performed (as for the fastening points, see the positions of the circles in FIG. 12). Then, in the connection part of the front cover 61 and the rear cover 71, although fixing in the front to back direction is firmly performed, positional displacement on the order of dimensional tolerance of the cover fixed frame 46 can be allowed. Namely, as shown in FIG. 20A, the front cover 61 and the rear cover 71 are firmly fixed at three circle positions by the first front locking claw 68*a*, the second front locking claw 68*b*, and the rear locking claw 78*a* with respect to the direction to be divided in the front to back direction, but configured to be allowed with respect to the positional displacement (on the order of dimensional tolerance) of the cover fixed frame 46. More specifically, due to the positional displacement of the fastening point of the tapping screw and the cover fixed frame 46, the covers are connected as shown in FIG. 20B if the cover fixed frame 46 is displaced to the front side, and they are connected as shown in FIG. 20C if the cover fixed frame 46 is displaced to the rear side. Namely, in FIG. 20B and FIG. 20C, as with FIG. 20A, the covers are similarly firmly fixed at three circle positions in the front to back direction, and they respond flexibly to the positional displacement of the cover fixed frame 46. Therefore, in the present embodiment, in a state where bonding in the front to back direction is firmly held, the positional displacement of the fastening point of the tapping screw and the cover fixed frame 46 can be allowed.

Seat Housing Action

Next, the action of moving the seat main body from the usage state to the housed state is described with reference to FIGS. 21A, 21B and FIGS. 22A, 22B. It should be noted that FIGS. 21A, 21B and FIGS. 22A, 22B show the reclining device 13, the cushion pivoting device 25, and the leg pivoting device 28 in a locked state by a black circle and show the same in an unlocked state by a white circle. The same applies to FIGS. 23A, 23B and FIGS. 24A, 24B.

When the vehicular seat S is in the usage state shown in FIG. 21A, the seat back 1 is supported by the support base 40 and locked to a rising attitude by the reclining device 13, and the seat cushion 2 connected to the seat back 1 is supported by the detachable leg 30 held by the leg holding member 50 from below.

Figure 21B:
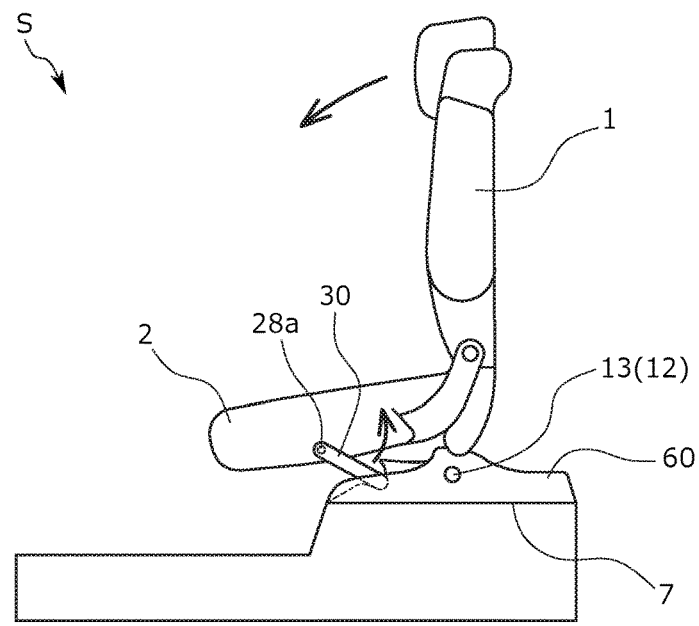
FIG. 21B is a view illustrating the moving action from the usage state to the housed state.

When moving the vehicular seat S from the usage state to the housed state, the operating lever 1*c* of FIG. 1 provided on the upper surface of the seat back 1 is operated. As shown in FIG. 21B, upon operating the operating lever 1*c* by an occupant, the locked state of the reclining device 13 is released, and the seat back 1 begins rotation to the seat front side around the seat pivot shaft 12 to move the seat cushion 2 to the housing floor by a biasing force of the spiral spring. The detachable leg 30 begins rotation to the seat cushion 2 side around the leg pivot shaft 28*a* with respect to the seat cushion 2 in conjunction with the rotation of the seat back 1. At this time, the detachable leg 30 becomes in a stretched state between the seat cushion 2 and the vehicle body floor side, thereby configured to stably move the seat cushion 2 and the seat back 1.

It should be noted that a known cable (not shown) is connected between the operating lever 1*c* and the reclining device 13, and that the reclining device 13 has a mechanism in which the cable is pulled by operation of the operating lever 1*c* to release the locked state. It is desirable that the cable is positioned by passing through a region surrounded by the back frame 10, the connecting bracket 11, and the reinforcing bracket 11*a* in the periphery of the reclining device 13.

When the seat back 1 reaches to a predetermined rotational position as shown in FIG. 22A, the detachable leg 30 is detached from the leg holding member 50. The detached detachable leg 30 rotates to be folded to the seat cushion 2 side around the leg pivot shaft 28*a* against a biasing force of the spring member 28*b*, by running upon the upper surface of the base cover 60. Then, the detachable leg 30 is locked in a state of being housed in the seat cushion 2 side by the leg pivoting device 28 when reaching to a predetermined rotational position.

Figure 22B:
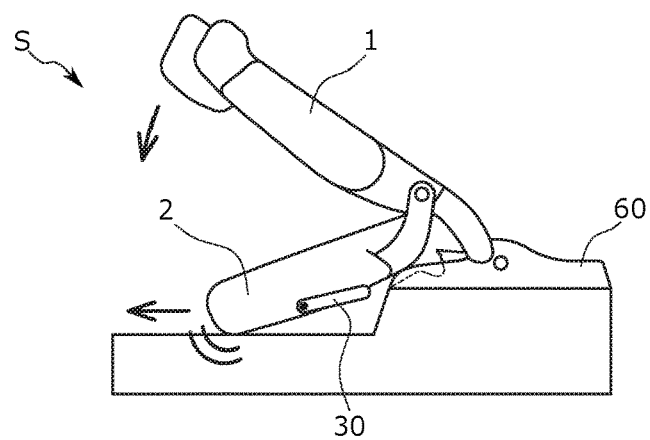
FIG. 22B is a view illustrating the moving action to the housed state.
Figure 22C:
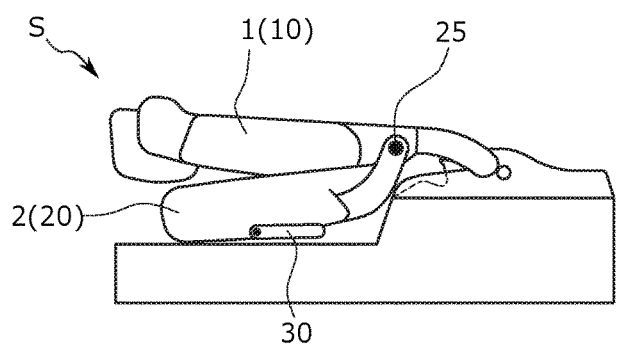
FIG. 22C is a view illustrating the moving action to the housed state.

Further, when the seat back 1 reaches to a predetermined rotational position as shown in FIG. 22B, the front portion of the seat cushion 2 abuts the housing floor surface earlier than the detachable leg 30. It should be noted that to the front portion of the seat cushion 2, a sliding member (not shown) slidable with respect to the housing floor surface is mounted, and that the seat cushion 2 can stably slide on the housing floor surface toward the seat front side.

As shown in FIG. 22C, by a series of actions described above, the seat main body is housed in the housing floor, and the vehicular seat S is switched to the housed state. The seat cushion 2 is locked by the cushion pivoting device 25, in the housed state, concretely, in a state where the seat back 1 is folded to the seat cushion 2 side. The detachable leg 30 is arranged at a position lower than the leg holding member 50 in the housed state.

Seat Tip-Up Action

Figure 23A:
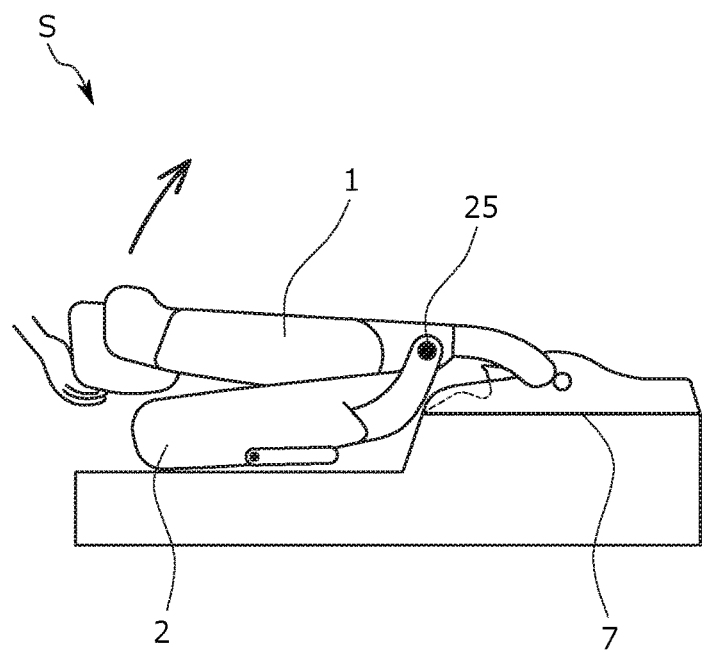
FIG. 23A is a side view of the vehicular seat, and is a view illustrating a moving action from the housed state to a tip-up state.

Next, the action of moving the seat main body from the housed state to the tip-up state is described with reference to FIGS. 23A, 23B. When the vehicular seat S is in the housed state shown in FIG. 23A, the occupant raises the seat main body upward manually, thereby the vehicular seat S is switched to the tip-up state shown in FIG. 23B. At this time, the cushion pivoting device 25 locks the pivot motion of the seat cushion 2, so it is possible to raise the seat cushion 2 upward integrally by raising the seat back 1 upward. It should be noted that in the tip-up state, it is possible to secure a wide luggage room space in the seat front side by sliding the upper rails 7b to the seat rear side with respect to the lower rails 7a.

Figure 23B:
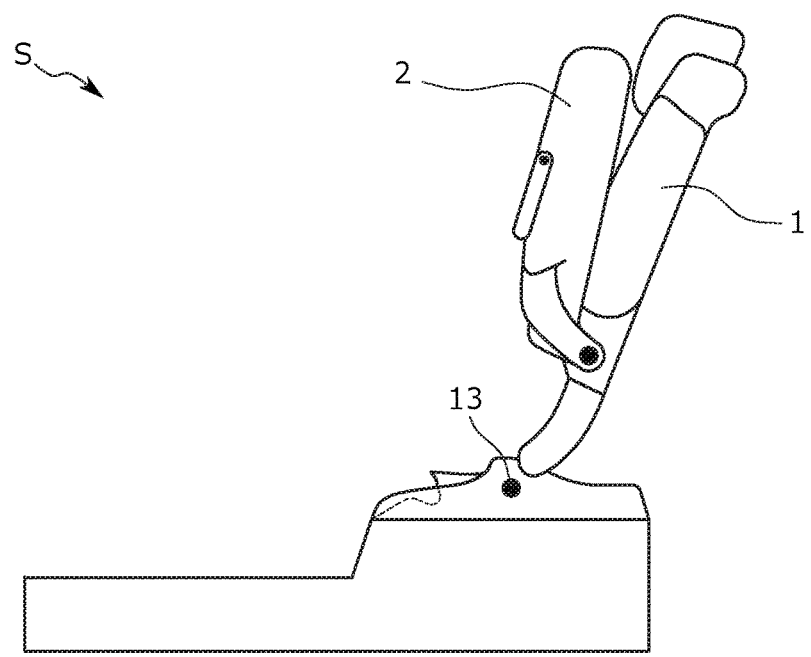
FIG. 23B is a view illustrating the moving action from the housed state to the tip-up state.

When the vehicular seat S switches to the tip-up state shown in FIG. 23B, the seat back 1 returns to the same position as the position in the usage state, and is locked in the rising attitude by the reclining device 13.

Seat Return Action

Next, the action of moving the seat main body from the tip-up state to the usage state is described with reference to FIGS. 24A, 24B. As shown in FIG. 24A, when moving the vehicular seat S from the tip-up state to the usage state, for example, the detachable leg 30 functioning as an operating portion is operated. An occupant pulls the detachable leg 30 to be rotated upwardly around the leg pivot shaft 28a, in other words, pulls it in the direction away from the seat cushion 2 side, thereby releasing the locked state of the cushion pivoting device 25 and the leg pivoting device 28. It should be noted that a known cable (not shown) is connected between the detachable leg 30 and the cushion pivoting device 25 and, that the cable is configured to be pulled by operation of the detachable leg 30 to release the locked state.

Figure 24B:
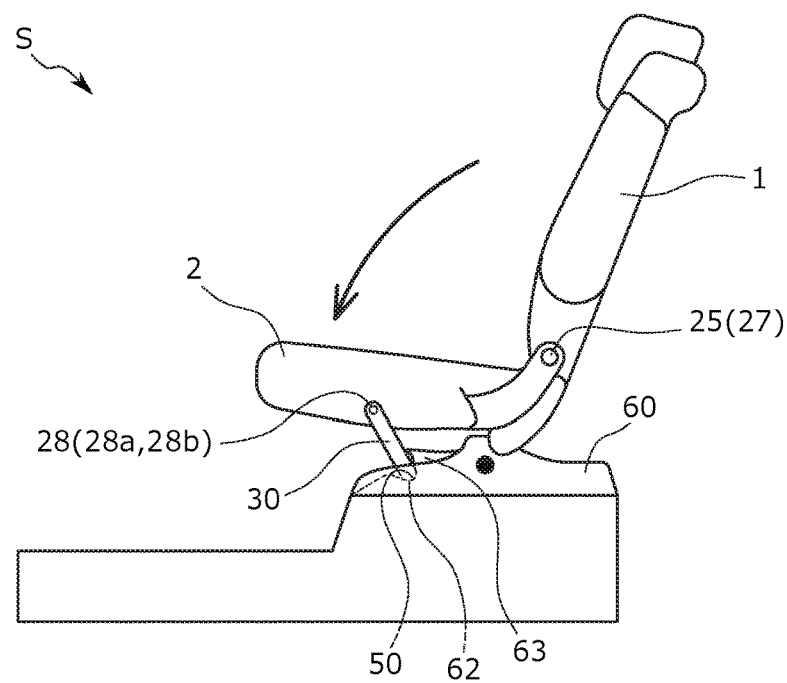
FIG. 24B is a view illustrating the return action from the tip-up state to the usage state.

As shown in FIG. 24B, the seat cushion 2 is rotated to the lower side with respect to the seat back 1 by a biasing force of the spiral spring 27 in association with release of the cushion pivoting device 25. The detachable leg 30 is rotated around the leg pivot shaft 28a to a position where the detachable leg 30 is attachable to the leg holding member 50 by a biasing force of the spring member 28b in association with release of the leg pivoting device 28, thereby being attached to the leg holding member 50. At this time, the detachable leg 30 moves toward the leg holding member 50 mounted to the lower end side of the leg accommodating concave part 62 by being guided by the leg accommodating concave part 62 and the leg movement restricting part 63, of the base cover 60. By a series of actions described above, the vehicular seat S returns to the usage state shown in FIG. 24B.

OTHER EMBODIMENTS

In the above embodiment, as shown in FIG. 21A, the housing floor is formed in front of the seat of the vehicular seat S, but not particularly limited thereto, the housing floor may be formed at the rear of the vehicular seat S. In that case, it is desirable that the positional relationship in the seat front to back direction between the seat pivot shaft 12 and the detachable leg 30 is arranged in reverse. Moreover, as another example of the housed state, a state where the seat back 1 is folded and the seat main body is flipped up and rotated to one side in the seat width direction may be assumed as the housed state.

In the above embodiment, the housed state of the seat main body has been described as the state corresponding to the movement state, but other embodiments are not particularly limited thereto, and the tip-up state and the like in the present embodiment may, of course, correspond to the movement state.

In the above embodiment, as shown in FIG. 3 and FIG. 4, the reclining device 13 is connected to the rail devices 7 (the upper rails 7b) on the vehicle body floor via the support base 40, but other embodiments are not particularly limited thereto, and the reclining device 13 may be directly mounted to the upper rails 7b without the support base 40. Moreover, in the reclining device 13, the seat back 1 and the support base 40 may be directly connected via the seat pivot shaft 12 without the connecting brackets 11. Further, the seat back 1 and the upper rails 7b may be, of course, directly connected without support base 40.

In the above embodiment, as shown in FIG. 3, the anchor member 9 is connected to the upper rails 7b via the rail connection part 7c, but other embodiments are not particularly limited thereto, and the anchor member 9 may be directly connected to the upper rails 7b, or may be connected further via another component part.

In the above embodiment, as shown in FIG. 21B, the detachable leg 30 is configured to be rotated to the seat rear side around the leg pivot shaft 28a with respect to the seat cushion 2 and accommodated in the seat cushion 2 side when switched from the usage state to the housed state, but other embodiments are not particularly limited thereto, and thus the detachable leg 30 may be configured to be rotated to the seat front side around the leg pivot shaft 28a and accommodated in the seat cushion 2 side. At this time, the upper end portion of the detachable leg 30 is arranged at the rear of the seat than the lower end portion of the detachable leg 30, and the detachable leg 30 is desirable to be upwardly inclined to the rear part from the lower end portion side thereof toward the upper end portion side thereof, thereby becoming easier to be accommodated and rotated in the seat cushion 2 side.

In the above embodiment, as shown in FIG. 3, the support base 40 is fixed to the vehicle body floor via the rail devices 4, but other embodiments are not particularly limited thereto, and thus the support base 40 may be appropriately changed to be fixed directly to the vehicle body floor without the rail devices 7, for example.

In the above embodiment, as shown in FIG. 12, the cover mounting part 65 is formed into a concave shape recessed to the lower side from the upper surface of the base cover 60 and is bolted in a state of abutting the support base 40 side, but other embodiments are not particularly limited thereto, and the shape of the cover mounting part 65 can be appropriately changed as long as it has a shape configured to mount to the support base 40 side. Moreover, as long as the cover mounting part 65 is arranged in a peripheral portion of the leg holding member 50, the positional relationship in the seat front to back direction and the seat width direction may be appropriately changeable.

In the above embodiment, as shown in FIG. 7, both center positions in the seat width direction of the seat back 1 and the floor connecting member 6 are offset-arranged to be displaced to the left side with respect to the center position of the seat cushion 2, but may be, in other embodiments, offset-arranged to be displaced to the right side.

In the above embodiment, the vehicular seat configured to house used for automobiles has been described as a specific example, but other embodiments are not limited thereto, and thus the vehicular seat can be used as a seat for vehicles such as aircrafts and ships, in addition to vehicular seats for trains, busses and the like.

In the present embodiment, the vehicular seat S according to an embodiment of the present disclosure has been mainly described. However, the above embodiment is merely an example to facilitate understanding of the present disclosure, and the present disclosure is not limited thereto. The present disclosure can be changed and improved without departing from the gist thereof, and as a matter of course, the present disclosure includes equivalents thereof.

TABLE OF REFERENCE NUMERALS

S: Vehicular seat
1: Seat back
   1a, 2a, 3a: Cushion pad
   1b, 2b, 3b: Skin
   1c: Operating lever
2: Seat cushion
3: Headrest
4: Armrest
5: Buckle
6: Floor connecting member
   6a: Front floor connecting member
   6b: Rear floor connecting member
7: Rail device
   7a: Lower rail
   7b: Upper rail
   7c: Rail connection part
8: Rail locking device
   8a: Rail locking main body
   8b: Pivot bar
   8c: Pivot shaft
   8d: First operation strap
   8e: Second operation strap (Operation strap), operation member
   8f: Pull cable
   8g: Strap hooking groove
9: Anchor member
10: Back frame
11: Connecting bracket
   11a: Reinforcing bracket
   11b: Flange part
   11c: Bracket cover
12: Seat pivot shaft
13: Reclining device
   13a: reclining main body
14: Reclining mounting bracket
   14a: Outer bracket
   14b: Inner bracket
   14c: Bolt assembling part
20: Cushion frame
21: Side frame
   21a: Outer cushion cover
   21b: Inner cushion cover
22: Front connecting pipe
23: Central connecting pipe
24: Pan frame
25: Cushion pivoting device
26: Cushion pivot shaft
27: Spiral spring
28: Leg pivoting device
   28a: Leg pivot shaft
   28b: Spring member
30: Detachable leg
31: Leg main body part
32: Leg connection part
40: Support base
41: Side base part
   41a: Support wall part
   41b: Inner wall part
   41c: Outer wall part
42: First base connection part
43: Second base connection part
44: Reinforcing base part
   44a: Connecting wall part
   44b: Inner wall part
   44c: Outer wall part
45: Holding member support part
   45a: Folded part
46: Cover fixed frame
47: Step part
50: Leg holding member
51: Side wall part
52: Bottom wall part
   52a: Cut and raised part
53: Curl part
54: Inertial locking device
60: Base cover
61: Front cover
62: Leg accommodating concave part
   62a: Front and back side wall part
   62b: Right and left side wall part
   62c: Bottom wall part
63: Leg movement restricting part
64: Base abutting part
65: Cover mounting part
66: Reinforcing rib
67: Abutting rib
68: Front side connection part
   68a: First front locking claw (The other locking claw)
   68b: Second front locking claw
   R1: Front rib (Rib)
69A: Front side reclining device arrangement part
69B: Front side seat belt buckle supporting member through hole (Through hole)
69C: Front side connecting bracket through hole (Through hole)
69D: Front side part fitting hole
71: Rear cover
72: Anchor through hole
73: Strap through hole
74: Dividing wall part
75: Reinforcing rib
78: Rear side connection part
   78a: Rear locking claw (One locking claw)
   171: Rear locking claw hanging piece
   172: Rear locking claw pressing piece (One locking claw)
   R2: Rear rib 78*b*: First front locking claw through hole (Guide hole part)
78*c*: Second front locking claw through hole
79A: Rear side reclining device arrangement part
79B: Rear side seat belt buckle supporting member through hole (Through hole)
79C: Rear side connecting bracket through hole (Through hole)
79D: Rear side part fitting claw
H1: Reclining device arrangement part
H2: Seat belt buckle supporting member through hole (Through hole)
H3: Connecting bracket through hole (Through hole)

The invention claimed is:

1. A vehicular seat, comprising:
a seat main body having a seat back which is a backrest part, and a seat cushion which is connected to the seat back and is a seating part, wherein the seat main body is configured to be housed in a housing position formed in a vehicle body floor;
right and left lower rails that are mounted to the vehicle body floor and extend in a seat front to back direction;
right and left upper rails that are slidably mounted along the lower rails and support the seat main body;
a reclining device that is arranged at a height position which overlaps the upper rails in an up and down direction and pivotably supports the seat main body from a vehicle body floor side of the seat main body;
a support base mounted to the right and left upper rails that supports the seat main body; and
a connecting bracket that connects a lower end portion of the seat back and the reclining device;
wherein the connecting bracket is mounted further to an outside in a seat width direction than the reclining device and arranged at a position to sandwich the reclining device between the support base and the connecting bracket.

2. The vehicular seat according to claim 1, wherein the seat main body is configured to be housed in a position lower than the vehicle body floor, the vehicular seat further comprising:
a seat pivot shaft mounted to the support base and connected to one end side of the seat main body in the seat front to back direction as a pivot shaft of the reclining device; and
a detachable leg, an upper end portion of the detachable leg being mounted to an other end side of the seat main body and a lower end portion of the detachable leg being detachably supported on the support base.

3. The vehicular seat according to claim 1, wherein the reclining device is arranged further to an outside in a seat width direction than one of the upper rails.

4. The vehicular seat according to claim 1, further comprising a rail locking device mounted between the right and left upper rails and configured to lock the upper rails in a state of being supported by the lower rails;
wherein the reclining device is arranged to overlap the rail locking device in the seat front to back direction.

5. The vehicular seat according to claim 1, further comprising a buckle arranged further to an outside in a seat width direction than the seat main body and configured for attachment of a tongue plate provided at a seat belt;
wherein the reclining device and the buckle are arranged at opposite positions of the seat main body in the seat width direction relative to each other.

6. The vehicular seat according to claim 1, further comprising floor connecting members that connect the lower rails to the vehicle body floor;
wherein the floor connecting members are arranged in right and left positions that overlap the reclining device in a seat width direction.

7. The vehicular seat according to claim 6, wherein the floor connecting members are arranged behind the reclining device in the seat front to back direction.

8. The vehicular seat according to claim 6, wherein at least one of the floor connecting members is arranged in front of the reclining device in the seat front to back direction.

9. The vehicular seat according to claim 1, further comprising right and left connecting brackets that are respectively provided in right and left side portions of the seat back and connect a lower end portion of the seat back to the support base;
wherein one of the right and left connecting brackets is arranged further to an outside in a seat width direction than one of the upper rails, and the other of the right and left connecting brackets is arranged further to an inside in the seat width direction than the other of the upper rails.

10. The vehicular seat according to claim 1, wherein an anchor member for connecting a child seat is mounted to the rear portions of the upper rails.

11. The vehicular seat according to claim 10, further comprising a rail locking device configured to lock the upper rails in a state of being supported by the lower rails;
wherein the rail locking device has an operation member configured to switch the rail locking device between a locked state where the upper rails are locked and an unlocked state; and
wherein the operation member is arranged adjacent to the anchor member.

12. The vehicular seat according to claim 1, configured to switch between a usage state where an occupant can sit and a movement state where the seat main body is moved from the usage state, the vehicular seat further comprising:
a support base provided on the vehicle body floor side of the seat main body;
a seat pivot shaft mounted to the support base and connected to one end side of the seat main body either in the seat front to back direction or in a seat width direction so that the seat main body is pivotable;
a detachable leg, an upper end side of the detachable leg being mounted to an other end side of the seat main body and a lower end side of the detachable leg being detachably held by a leg holding member provided on the support base; and
a base cover that covers the support base from above and is configured to guide the detachable leg to move together with the seat main body when the seat main body moves between the usage state and the movement state;
wherein the base cover comprises a cover mounting part that is arranged in the periphery of the leg holding member and configured to mount to the support base.

13. A vehicular seat, comprising:
a seat main body having a seat back which is a backrest part, and a seat cushion which is connected to the seat back and is a seating part, wherein the seat main body is configured to be housed in a housing position formed in a vehicle body floor;
right and left lower rails that are mounted to the vehicle body floor and extend in a seat front to back direction;

right and left upper rails that are slidably mounted along the lower rails and support the seat main body; and a reclining device that is arranged at a height position which overlaps the upper rails in an up and down direction and pivotably supports the seat main body from a vehicle body floor side of the seat main body;

wherein the vehicular seat is configured to switch between a usage state where an occupant can sit and a movement state where the seat main body is moved from the usage state, the vehicular seat further comprising:

a support base which is provided on the vehicle body floor side of the seat main body and arranged in a lower part of the seat cushion, and to which the lower end side of the seat back is pivotably connected;

a seat pivot shaft mounted to the support base and connected to one end side of the seat main body either in the seat front to back direction or in a seat width direction so that the seat main body is pivotable; and a base cover that covers the support base from above;

wherein side portions of the support base are defined by a pair of side base parts;

wherein the base cover is configured to be divided into a front cover and a rear cover in the seat front to back direction; and wherein a rear side portion of the front cover and a front side portion of the rear cover are fixed in a state where a cover fixed frame arranged to bridge the pair of side base parts is sandwiched therebetween.

14. The vehicular seat according to claim 13, further comprising:

a support base mounted to the right and left upper rails that supports the seat main body; and a connecting bracket that connects a lower end portion of the seat back and the reclining device;

wherein the connecting bracket is mounted further to an outside in a seat width direction than the reclining device and arranged at a position to sandwich the reclining device between the support base and the connecting bracket.

15. The vehicular seat according to claim 14, wherein an anchor member for connecting a child seat is mounted to the rear portions of the upper rails.

16. The vehicular seat according to claim 15, further comprising a rail locking device configured to lock the upper rails in a state of being supported by the lower rails;

wherein the rail locking device has an operation member configured to switch the rail locking device between a locked state where the upper rails are locked and an unlocked state; and wherein the operation member is arranged adjacent to the anchor member.

17. A vehicular seat, comprising:

a seat main body having a seat back which is a backrest part, and a seat cushion which is connected to the seat back and is a seating part, wherein the seat main body is configured to be housed in a housing position formed in a vehicle body floor;

right and left lower rails that are mounted to the vehicle body floor and extend in a seat front to back direction;

right and left upper rails that are slidably mounted along the lower rails and support the seat main body; and a reclining device that is arranged at a height position which overlaps the upper rails in an up and down direction and pivotably supports the seat main body from a vehicle body floor side of the seat main body;

wherein the vehicular seat is configured to switch between a usage state where an occupant can sit and a movement state where the seat main body is moved from the usage state, the vehicular seat further comprising:

floor connecting members that connect the vehicular seat to the vehicle body floor;

wherein a center position of the seat back in a seat width direction is arranged to be displaced to one side in the seat width direction with respect to a center position of the seat cushion; and wherein a center position of the floor connecting member in the seat width direction is arranged to be displaced to the one side with respect to the center position of the seat cushion.

18. The vehicular seat according to claim 17, further comprising:

a support base mounted to the right and left upper rails that supports the seat main body; and a connecting bracket that connects a lower end portion of the seat back and the reclining device;

wherein the connecting bracket is mounted further to an outside in a seat width direction than the reclining device and arranged at a position to sandwich the reclining device between the support base and the connecting bracket.

19. The vehicular seat according to claim 18, wherein an anchor member for connecting a child seat is mounted to the rear portions of the upper rails.

20. The vehicular seat according to claim 19, further comprising a rail locking device configured to lock the upper rails in a state of being supported by the lower rails;

wherein the rail locking device has an operation member configured to switch the rail locking device between a locked state where the upper rails are locked and an unlocked state; and wherein the operation member is arranged adjacent to the anchor member.

* * * * *